US009582416B2

(12) United States Patent
Yeh

(10) Patent No.: US 9,582,416 B2
(45) Date of Patent: Feb. 28, 2017

(54) DATA ERASING METHOD, MEMORY CONTROL CIRCUIT UNIT AND MEMORY STORAGE APPARATUS

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 176 days.

(21) Appl. No.: 14/166,815

(22) Filed: Jan. 28, 2014

(65) Prior Publication Data
US 2015/0161039 A1    Jun. 11, 2015

(30) Foreign Application Priority Data

Dec. 9, 2013   (TW) .............................. 102145213 A

(51) Int. Cl.
| | | |
|---|---|---|
| G06F 12/00 | (2006.01) | |
| G06F 12/02 | (2006.01) | |
| G06F 3/06 | (2006.01) | |
| G06F 21/79 | (2013.01) | |

(52) U.S. Cl.
CPC ........ G06F 12/0246 (2013.01); G06F 3/0604 (2013.01); G06F 3/065 (2013.01); G06F 3/0652 (2013.01); G06F 3/0659 (2013.01); G06F 3/0679 (2013.01); G06F 21/79 (2013.01); *G06F 2003/0697* (2013.01); *G06F 2212/1052* (2013.01); *G06F 2212/7205* (2013.01); *G06F 2221/2143* (2013.01)

(58) Field of Classification Search
CPC .. G06F 12/0246; G06F 3/0679; G11C 16/102

USPC .......................................................... 711/103
See application file for complete search history.

(56) References Cited

U.S. PATENT DOCUMENTS

| | | | |
|---|---|---|---|
| 2012/0144097 A1 | 6/2012 | Hashimoto | |
| 2012/0221776 A1* | 8/2012 | Yoshihashi | G06F 12/0804 711/103 |
| 2013/0275660 A1* | 10/2013 | Bennett | G06F 12/0292 711/103 |

OTHER PUBLICATIONS

Smith, Kent, Garbage Collection, Understanding Foreground vs. Background GC and Other Related Elements, SandForce, Flash Memory Summit, Aug. 2011.*

(Continued)

*Primary Examiner* — Prasith Thammavong
*Assistant Examiner* — Edmund Kwong
(74) *Attorney, Agent, or Firm* — Jianq Chyun IP Office

(57) ABSTRACT

A data erasing method for a rewritable non-volatile memory module is provided. The method includes receiving a predetermined command for performing on a first logical sub-unit from a host system; marking a first physical programming unit mapped to the first logical sub-unit as being in an invalid data status and recording a mark for a first physical erasing unit that the first physical programming unit belongs to, in response to the predetermined command. The method further includes selecting the first physical erasing unit according to the mark, copying valid data in the first physical erasing unit to a second physical erasing unit gotten from a spare area of the rewritable non-volatile memory module and erasing data stored in the first physical erasing unit.

12 Claims, 24 Drawing Sheets

(56) References Cited

OTHER PUBLICATIONS

"Office Action of Taiwan Counterpart Application", issued on Jul. 29, 2015, p. 1-p. 10, in which the listed reference was cited.

* cited by examiner

DATA ERASING METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 102145213, filed on Dec. 9, 2013. The entirety of the above-mentioned patent application is hereby incorporated by reference herein and made a part of this specification.

BACKGROUND

Technology Field

The present invention relates to a data erasing method for a rewritable non-volatile memory module, and a memory control circuit unit and a memory storage apparatus using the same.

Description of Related Art

Along with the widespread of digital cameras, cell phones, and MP3 in recently years, the consumers' demand for storage media has increased drastically. Since a rewritable non-volatile memory is characterized by non-volatility of data, low power consumption, small capacity, non-mechanical structure, and fast reading and writing speed, the rewritable non-volatile memory is the most adaptable memory to be applied in a portable electronic product, e.g., a notebook computer. A solid state drive is a storage apparatus adopting flash memory as storage medium. Therefore, the flash memory industry has become a very popular part of the electronic industry in recent years.

The flash memory module has several physical erasing units and every physical erasing unit has several physical programming units, wherein it must write data with the order of the physical programming units when writing data in the physical erasing units. In addition, a physical programming unit containing data must to be erased before being used for writing new data. Particularly, each physical erasing unit is the smallest erasing unit, and each physical programming unit is the smallest programming (i.e., writing) unit. Therefore, in the management of the flash memory module, the physical erasing units are grouped into a data area and a spare area.

The physical erasing units of the data area are used for storing data written by the host system. To be more specific, a memory control circuit unit in a memory storage apparatus converts a logical access address accessed by the host system into a logical sub-unit of a logical unit and maps the logical sub-unit of the logical unit to a physical programming unit of a physical erasing unit in the data area. Namely, in the management of a flash memory module, the physical erasing units in the data area are deemed used physical erasing units (e.g., the physical erasing units already contain data written by the host system). For example, the memory control circuit unit may use the logical address-physical address mapping table to record the mapping relation of logical units and the physical erasing units of the data area, wherein the logical sub-units of a logical unit are corresponding to the physical programming units of the physical erasing unit mapped to this logical unit.

And, the physical erasing units of the spare area are used for substituting the physical erasing units of the data area. In particular, a physical erasing unit already containing data has to be erased before being used for writing new data, such that a physical erasing unit in the spare area is used for writing updated data in replacement of the physical erasing unit originally mapped to a logical unit. Hence, the physical erasing units in the spare area are either blank physical erasing units or usable physical erasing units (i.e., these physical erasing units do not contain data, or these physical erasing units contain data marked as being in an invalid data status).

In other words, the physical programming units of the physical erasing units in the data area and the spare area alternately map the logical sub-units of the logical units for containing data written by the host system. Thus, when the host system send a delete command asking for clearing the data of a logical sub-unit, the memory control circuit unit will mark the physical programming unit which mapped to this logical sub-unit (hereinafter, refer to the invalid data logical sub-unit) as being in an invalid data status. Even though the physical programming units mapped to the invalid data logical sub-units are already marked as being in an invalid data status in the management information of the memory control circuit unit, the data in the physical programming units would not really be deleted. Therefore, the data is still under a risk of being stolen.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The present invention provides a data erasing method, a memory control circuit unit, and a memory storage apparatus for preventing the deleted data in the non-volatile memory from being recovered and stolen.

The exemplary embodiment of the present invention provides a data erasing method for a rewritable non-volatile memory module, wherein the rewritable non-volatile memory module includes several physical erasing units, and each of the physical erasing units includes several physical programming units. The data erasing method including: grouping these physical erasing units into at least a data area and a spare area; configuring a plurality of logical units, wherein these logical units include a plurality of logical sub-units. The data erasing method including: receiving a write command and first data corresponding to the write command from a host system, wherein the write command indicates to write the first data into a first logical sub-unit of these logical sub-units. The data erasing method further including: selecting a first physical erasing unit from these physical erasing units of the spare area, programming the first data into a first physical programming unit of the first physical erasing unit according to the write command, and mapping the first logical sub-unit to the first physical programming unit. The data erasing method also including: receiving a predetermined command for performing on the first logical sub-unit from the host system; making a mark corresponding to the first physical programming unit mapped to the first logical sub-unit in a specific area as being in an invalid data status according to the predetermined command. The data erasing method further including: identifying the first physical erasing unit corresponding to the first physical programming unit mapped to the first logical sub-unit based on the mark, copying valid data of the first physical erasing unit to a second physical erasing unit which is selected from these physical erasing units of the spare area, and performing a physical erasing to the first physical erasing unit.

The exemplary embodiment of the present invention provides a memory control circuit unit configured to control a rewritable non-volatile memory module. The memory control circuit unit including: a host interface, a memory interface and a memory management circuit. The host interface is coupled to a host system. The memory interface is coupled to the rewritable non-volatile memory module, wherein the rewritable non-volatile memory module includes a plurality of physical erasing units, and each of the physical erasing units includes a plurality of physical programming units. The memory management circuit is coupled to the host interface and the memory interface, and is configured to group the physical erasing units into at least a data area and a spare area. Here, the memory management circuit is further configured to configure a plurality of logical units and these logical units include a plurality of logical sub-units. Also, the memory management circuit is further configured to receive a write command and first data corresponding to the write command from a host system, wherein the write command indicates to write the first data into a first logical sub-unit of these logical sub-units. Moreover, the memory management circuit is further configured to select a first physical erasing unit from these physical erasing units of the spare area, program the first data into a first physical programming unit of the first physical erasing unit according to the write command, and map the first logical sub-unit to the first physical programming unit. Moreover, the memory management circuit is further configured to receive a predetermined command for performing on the first logical sub-unit from the host system. The memory management circuit is further configured to make a mark corresponding to the first physical programming unit mapped to the first logical sub-unit in a specific area as being in an invalid data status according to the predetermined command. Also, the memory management circuit is further configured to identify the first physical erasing unit corresponding to the first physical programming unit mapped to the first logical sub-unit based on the mark, copy valid data of the first physical erasing unit to a second physical erasing unit which is selected from these physical erasing units of the spare area, and perform a physical erasing to the first physical erasing unit.

The exemplary embodiment of the present invention provides a memory storage apparatus including: a connect interface unit, a rewritable non-volatile memory module and a memory control circuit unit. The connect interface unit is coupled to a host system. The rewritable non-volatile memory module has a plurality of physical erasing units, and each of the physical erasing units has several physical programming units. The memory control circuit unit is coupled to the connect interface unit and the rewritable non-volatile memory module, and is configured to group the physical erasing units into at least a data area and a spare area. Here, the memory control circuit unit is further configured to configure a plurality of logical units and these logical units include a plurality of logical sub-units. Also, the memory control circuit unit is further configured to receive a write command and first data corresponding to the write command from the host system, wherein the write command indicates to write the first data into a first logical sub-unit of these logical sub-units. Moreover, the memory control circuit unit is further configured to select a first physical erasing unit from these physical erasing units in the spare area, program the first data in a first physical programming unit of the first physical erasing unit according to the write command, and map the first logical sub-unit to the first physical programming unit. Moreover, the memory control circuit unit is further configured to receive a predetermined command for performing on the first logical sub-unit from the host system. The memory control circuit unit is further configured to make a mark corresponding to the first physical programming unit mapped to the first logical sub-unit in a specific area as being in an invalid data status according to the predetermined command. Also, the memory control circuit unit is further configured to identify the first physical erasing unit corresponding to the first physical programming unit mapped to the first logical sub-unit based on the mark, copy valid data of the first physical erasing unit to a second physical erasing unit which is selected from these physical erasing units in the spare area, and perform a physical erasing to the first physical erasing unit.

In conclusion, the data erasing method, memory control circuit unit and memory storage apparatus provided by the exemplary embodiment of the present invention, after receiving the predetermined command, may mark the physical erasing unit mapped to the invalid data logical sub-unit in the garbage collection table, and will actually erase the data already be deleted through the data merge process to prevent the data from being recovered or stolen.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

The above and other features and advantages of example embodiments of the inventive concepts will become more apparent by describing in detail example embodiments with reference to the attached drawings.

DESCRIPTION OF EMBODIMENTS

Figure 1:
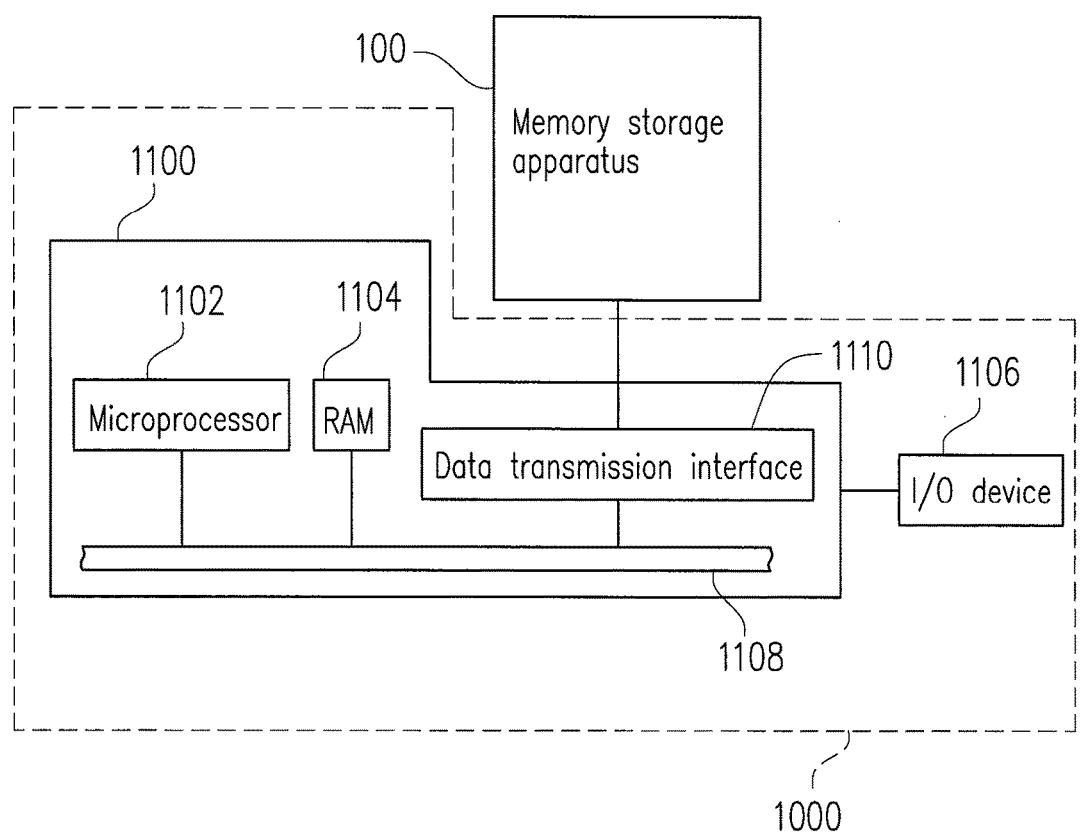
FIG. 1 illustrates a host system and a memory storage apparatus according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 illustrates a host system and a memory storage apparatus according to an exemplary embodiment of the present invention.

Figure 2:
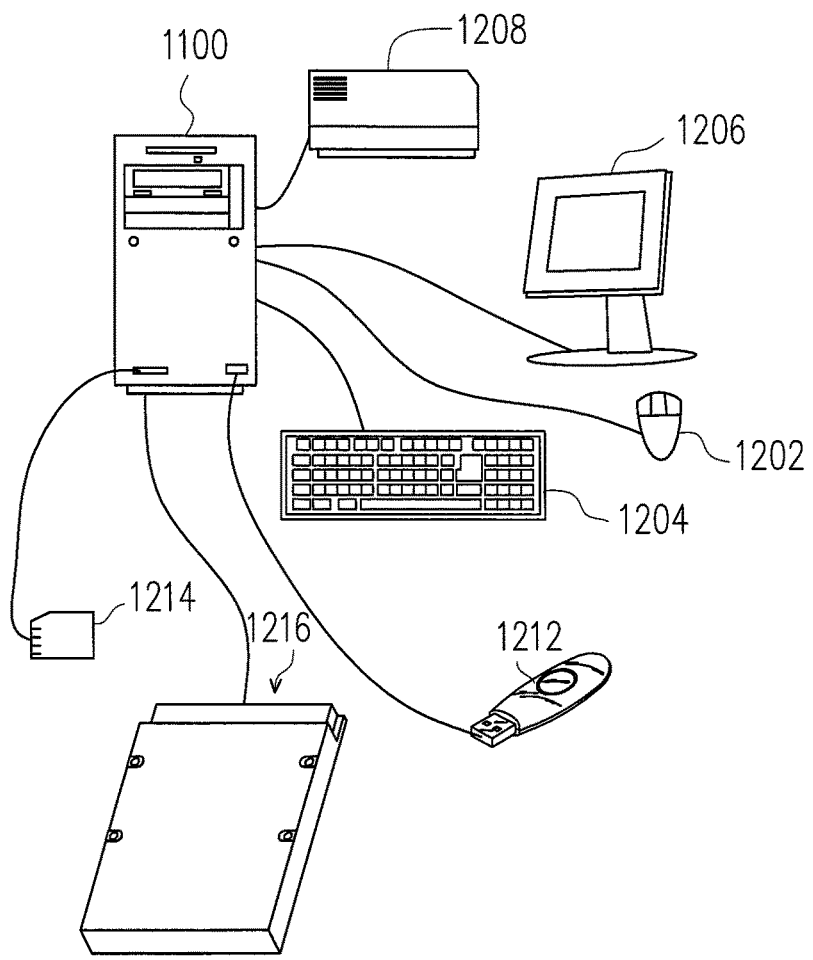
FIG. 2 illustrates a computer, an input/output (I/O) device, and a memory storage apparatus according to the exemplary embodiment of the present invention.

Referring to FIG. 1, a host system 1000 in most cases includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2. It should be understood that, the devices depicted in FIG. 2 should not be construed as limitations to the present disclosure, and the I/O device 1106 may include other devices as well.

In the exemplary embodiment of the present invention, the memory storage apparatus 100 is coupled to other devices of the host system 1000 through the data transmission interface 1110. By using the microprocessor 1102, the random access memory (RAM) 1104 and the Input/Output (I/O) device 1106, the data can be write into the memory storage apparatus 100 or can be read from the memory storage apparatus 100. For instance, the memory storage apparatus 100 may be a non-volatile memory storage apparatus, such as a flash drive 1212, a memory card 1214, or a solid state drive (SSD) 1216 as shown in FIG. 2.

Figure 3:
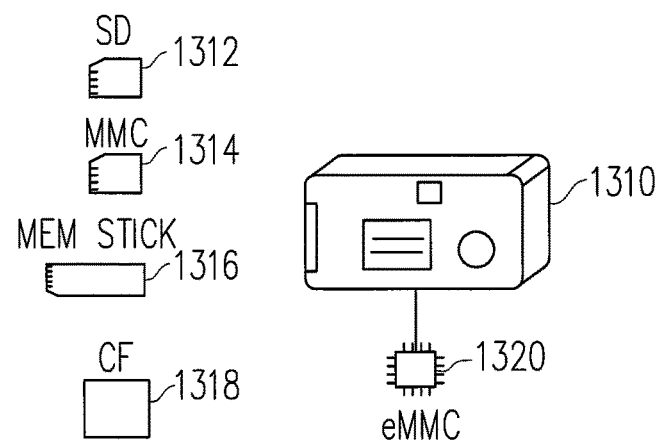
FIG. 3 illustrates a host system and a memory storage apparatus according to the exemplary embodiment of the present invention.

Generally, the host system 1000 can substantially be any system used together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so on. For instance, if the host system is a digital camera (video camera) 1310, the rewritable non-volatile memory storage apparatus is an SD card 1312, an MMC card 1314, a memory stick 1316, a CF card 1318n or an embedded storage apparatus 1320 (as shown in FIG. 3). The embedded storage device 1320 includes an embedded MMC (eMMC). It should be noted that the eMMC is directly coupled to a substrate of the host system.

Figure 4:
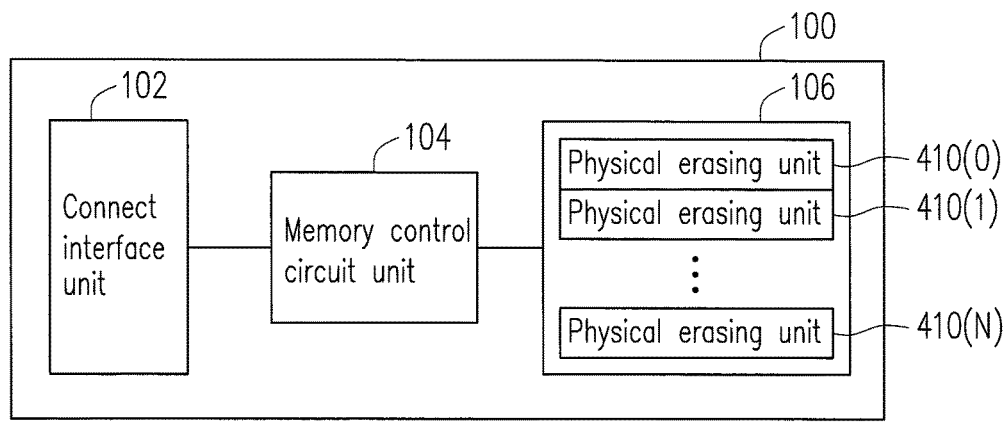
FIG. 4 is a schematic block diagram illustrating the memory storage apparatus depicted in FIG. 1.

FIG. 4 is a schematic block diagram illustrating the memory storage apparatus depicted in FIG. 1.

Referring to FIG. 4, the memory storage apparatus 100 includes a connect interface unit 102, a memory control circuit unit 104, and a rewritable non-volatile memory module 106.

In the present exemplary embodiment, the connect interface unit 102 complies with the serial advanced technology attachment (SATA) standard. However, the present invention is not limited thereto, and the connect interface unit 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) standard, the ultra high speed-I (UHS-I) interface standard, the ultra high speed-II (UHS-II) interface standard, the memory stick (MS) interface standard, the multi media card (MMC) interface standard, the eMMC interface standard, the universal flash storage (UFS) interface standard, the compact flash (CF) standard, the integrated device electronics (IDE) standard, or other suitable standards. In the present exemplary embodiment, the connecting interface unit and the memory control circuit unit may be packaged in one chip or laid outside a chip having the memory control circuit unit.

The memory control circuit unit 104 executes a plurality of logic gates or control commands which are implemented in a hardware form or in a firmware form and performing the operations such as data writing, reading or erasing in the rewritable non-volatile memory module 106 according to the command of the host system 1000.

The rewritable non-volatile memory module 106 is coupled to the memory control circuit unit 104 and is configured to store the data written by the host system 1000. The rewritable non-volatile memory module 106 includes a plurality of physical erasing units 410(0)-410(N). For instance, the physical erasing units 410(0)-410(N) can belong to the same memory die or different memory dies. Each of the physical erasing units includes a plurality of physical programming units, wherein the physical programming units which belong to the same physical erasing unit can be written separately but erased at the same time. However, the present invention is not limited thereto, and each of the physical erasing units may also be comprised of 64, 256, or any other number of physical programming units.

More specifically, the physical erasing unit is the smallest unit for erasing data. Namely, each of the physical erasing units contains the least number of memory cells that are erased all together. The physical programming unit is the smallest unit for programming data. That is, each of the physical programming units is the smallest unit for writing data. Each physical programming unit usually includes a data bit area and a redundant bit area. The data bit area includes a plurality of physical access addresses for storing user data, and the redundant bit area is configured for storing system data (e.g., control information and error correcting codes). In the present exemplary embodiment, each data bit area of the physical programming unit contains 4 physical access addresses, and the size of each physical access address is 512 bytes (512B). However, in other exemplary embodiments, more or less number of the physical access addresses may be contained in the data bit area, and the number and the size of the physical access addresses are not limited in the present invention. For instance, in an exemplary embodiment, the physical erasing units are physical blocks, and the physical programming units are physical pages or physical sectors, which should however not be construed as limitations to the present invention.

In the present exemplary embodiment, the rewritable non-volatile memory module 106 is a multi-level cell (MLC) NAND flash memory module (i.e., a flash memory module capable of storing data of 2 bits in one memory cell). However, the invention is not limited thereto, and the rewritable non-volatile memory module 106 may also be a single-level cell (SLC) NAND flash memory module (i.e., a flash memory module capable of storing data of one bit in one memory cell), a trinary-level cell (TLC) NAND flash memory module (i.e., a flash memory module capable of storing data of 3 bits in one memory cell), any other flash memory module, or any other memory module with the same characteristics.

Figure 5:
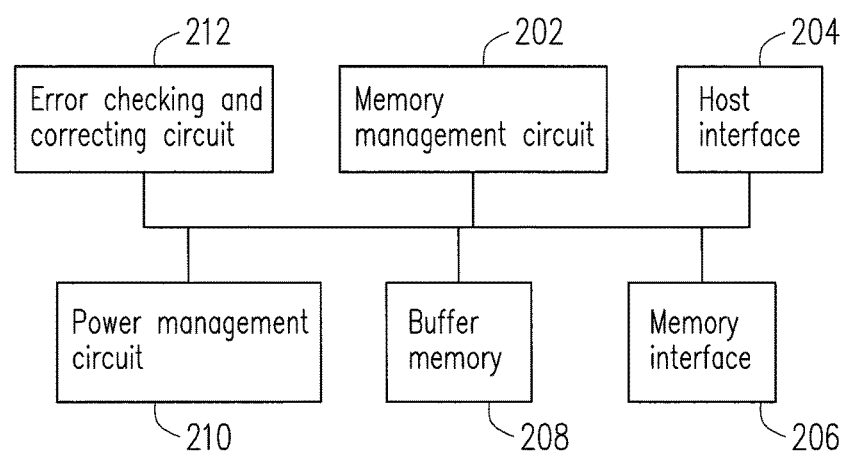
FIG. 5 is a schematic block diagram illustrating a memory control circuit unit according to an exemplary embodiment of the present invention.

FIG. 5 is a schematic block diagram illustrating a memory control circuit unit according to an exemplary embodiment of the present invention.

Referring to FIG. 5, the memory control circuit unit 104 includes a memory management circuit 202, a host interface 204 and a memory interface 206.

The memory management circuit 202 is configured to control the whole operation of the memory control circuit unit 104. Particularly, the memory management circuit 202 has a plurality of control instructions; when the memory storage apparatus 100 is operated, the control instructions are executed to perform a data writing operation, a data reading operation, a data erasing operation, and so on.

In the present exemplary embodiment, the control instructions of the memory management circuit 202 are implemented in a form of a firmware. For example, the memory management circuit 202 includes a microprocessor unit (not shown) and a read-only memory (ROM, not shown), where the control instructions are recorded in the read-only memory. When the memory storage apparatus 100 is operated, the control instructions are executed by a microprocessor unit to perform a data writing operation, a data reading operation, a data erasing operation, and so on.

In another exemplary embodiment of the present invention, the control instructions of the memory managing circuit 202 may also be stored in a specific block (for example, a system block in a memory module exclusively used for storing system data) of the rewritable non-volatile memory module 106 as a programming code. Moreover, the memory managing circuit 202 includes a microprocessor unit (not shown), a read-only memory (ROM, not shown) and a random access memory (not shown). In particular, the ROM has a boot code, and when the memory control circuit unit 104 is enabled, the microprocessor unit first executes the boot code to load the control instructions from the rewritable non-volatile memory module 106 into the RAM of the memory management circuit 202. The microprocessor unit then executes the control instructions to perform a data writing operation, a data reading operation, a data erasing operation, and so on.

Furthermore, as in another exemplary embodiment, the control instructions in the memory management circuit 202 are implemented in a form of hardware. For example, the memory management circuit 202 includes a micro controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro controller. The memory cell management circuit is configured to manage physical blocks of the rewritable non-volatile memory module 106. The memory writing circuit is configured to issue a write command to the rewritable non-volatile memory module 106 for writing data thereto. The memory reading circuit is configured to issue a read command to the rewritable non-volatile memory module 106 for reading data therefrom. The memory erasing circuit is configured to issue an erase command to the rewritable non-volatile memory module 106 for erasing data therefrom. The data processing circuit is configured to process data to be written to the rewritable non-volatile memory module 106 or data read from the rewritable non-volatile memory module 106.

The host interface 204 is coupled to the memory management circuit 202 and configured to receive and identify the commands and the data transmitted by the host system 1000. Namely, the commands and data transmitted by the host system 1000 are passed to the memory management circuit 202 through the host interface 204. In the present exemplary embodiment, the host interface 204 complies with the SATA standard. However, it should be understood that the present invention is not limited thereto, and the host interface 204 may comply with the PATA standard, the IEEE 1394 standard, the PCI express standard, the SD standard, the SATA standard, the UHS-I interface standard, the UHS-II interface standard, the MS standard, the MMC standard, the eMMC interface standard, the UFS interface standard, the CF standard, the IDE standard, or other suitable data transmission standards.

The memory interface 206 is coupled to the memory management circuit 202 for accessing the rewritable non-volatile memory module 106. In other words, the data intended to be written to the rewritable non-volatile memory module 106 is converted to an acceptable format for the rewritable non-volatile memory module 106 by the memory interface 206.

In an exemplary embodiment of the present invention, the memory control circuit unit 104 further includes a buffer memory 208, a power management circuit 210 and an error checking and correcting circuit 212.

The buffer memory 208 is coupled to the memory managing circuit 202 and configured to temporarily store the data and commands from the host system 1000 or the data from the rewritable non-volatile memory module 106.

The power managing circuit 210 is coupled to the memory management circuit 202 and configured to control the power of the memory storage apparatus 100.

The error checking and correcting circuit 212 is coupled to the memory management circuit 202 and configured to perform an error checking and correcting process to assure the accuracy of data. To be more specific, when the memory management circuit 202 receives a write command from the host system 1000, the error checking and correcting circuit 212 generates an error checking and correcting code (ECC code) corresponding to the data of the write command, and the memory management circuit 202 writes the data corresponding to the write command and the corresponding ECC code into the rewritable non-volatile memory module 106. Afterwards, when the memory management circuit 202 reads the data from the rewritable non-volatile memory module 106, the corresponding error checking and correcting code is also be read, and the error checking and correcting circuit 212 executes the error checking and correcting process to the read data according to the ECC code.

Figure 6:
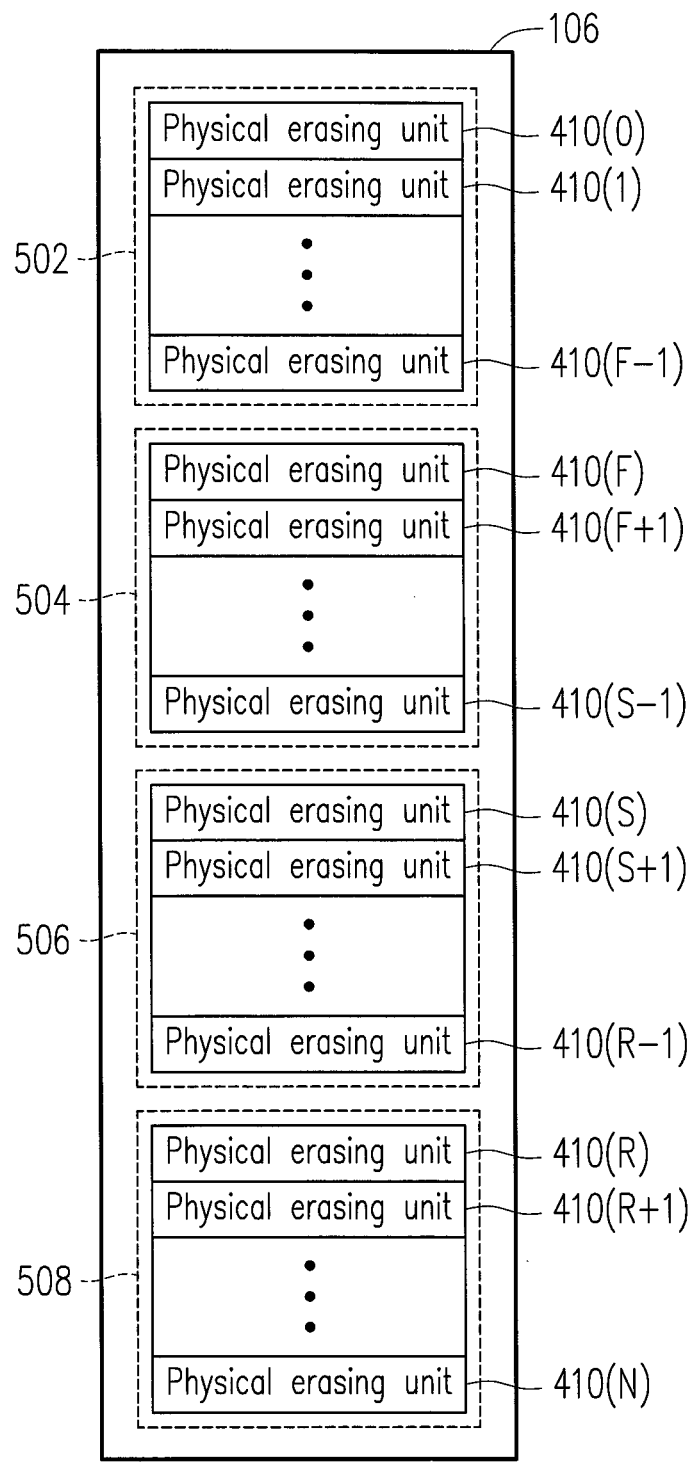
FIG. 6 and FIG. 7 are exemplary diagrams of managing physical erasing units according to the first exemplary embodiment of the present invention.
Figure 7:
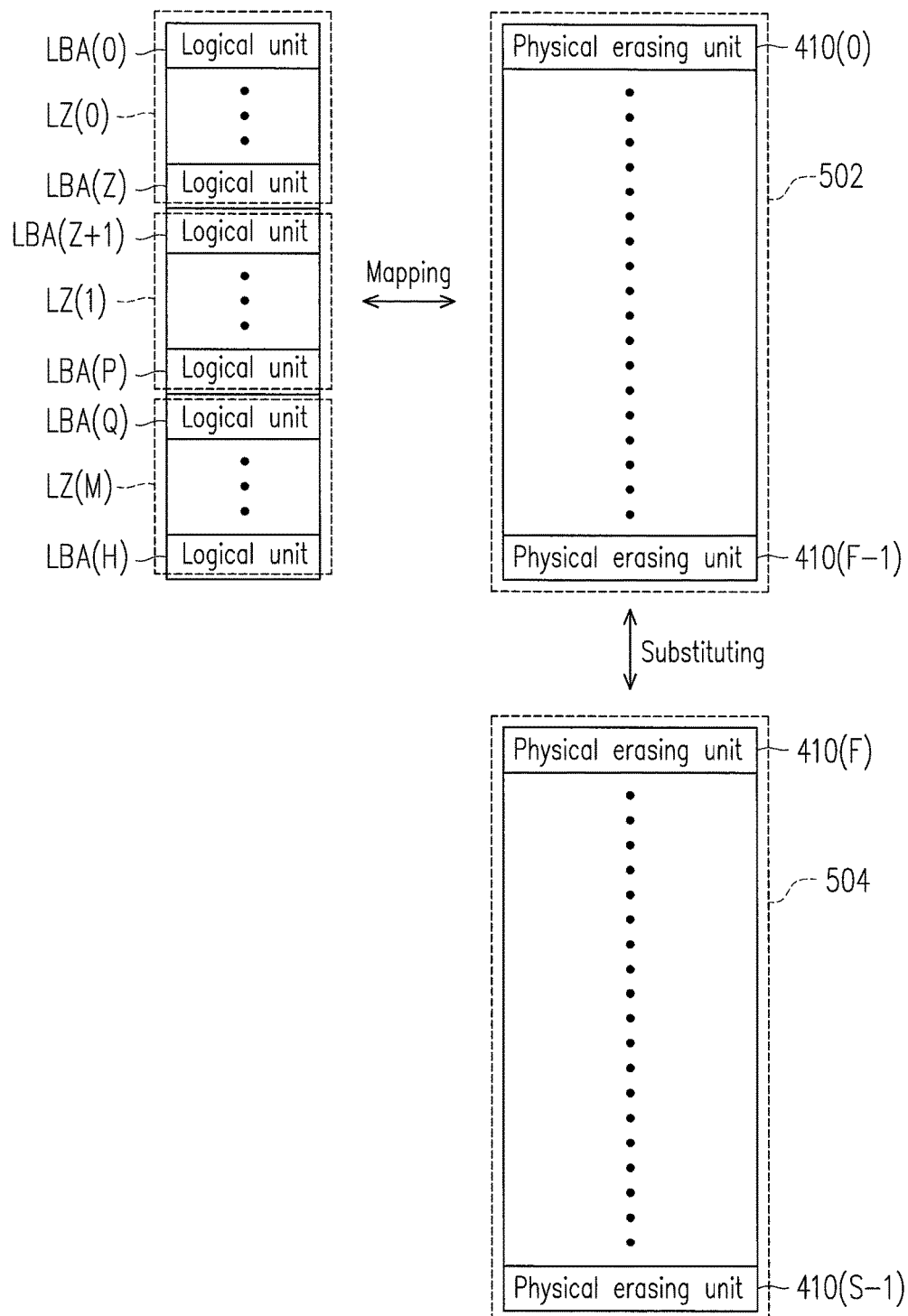

FIG. 6 and FIG. 7 are exemplary diagrams illustrating managing physical erasing units according to the first exemplary embodiment of the invention.

Referring to FIG. 6, the memory management circuit 202 of the memory controller 104 logically groups the physical erasing units 410(0)~410(N) into a data area 502, a spare area 504, a system area 506, and a replacement area 508.

The physical erasing units logically belonging to the data area 502 and the spare area 504 are used for storing data from the host system 1000. To be specific, the physical erasing units of the data area 502 are the physical erasing units which have been used for storing data, and the physical erasing units of the spare area 504 are the physical erasing units which are used for substituting the physical erasing units of the data area 502. Namely, when a write command and a data to be written are received from the host system 1000, the memory management circuit 202 gets a physical erasing unit from the spare area 504 and writes the data into the gotten physical erasing unit for substituting the physical erasing units of the data area 502.

The physical erasing units logically belonging to the system area 506 are used for recording system data. For instance, the system data includes the manufacturers and models of the rewritable non-volatile memory module, the number of physical erasing units in the rewritable non-volatile memory modules, the number of physical programming units in each physical erasing unit, and so on.

The physical erasing units logically belonging to the replacement area 508 are used in a bad physical erasing unit replacement procedure for replacing damaged physical erasing units. Particularly, if there are still normal physical erasing units in the replacement area 508, and a physical erasing unit in the data area 502 is damaged, the memory management circuit 202 selects a normal physical erasing unit from the replacement area 508 to replace the damaged physical erasing unit.

In particular, the numbers of physical erasing units in the data area 502, the spare area 504, the system area 506 and the replacement area 508 are various according to different memory module standards. Additionally, it has to be understood that the grouping relations of grouping the physical erasing units into the data area 502, the spare area 504, the system area 506 and the replacement area 508 are dynamically changed during the operations of the memory storage apparatus 100. For example, when a physical erasing unit in the spare area 504 is damaged and replaced by a physical erasing unit in the replacement area 508, the physical erasing unit in the replacement area 508 is associated with the spare area 504.

Referring to FIG. 7, the memory control circuit unit 104 (or memory management circuit 202) configures a plurality of logical units LBA(0)~LBA(H) for mapping the physical erasing units of the data area 502, wherein each logical units includes a plurality of logical sub-units for orderly mapping to the physical programming units of the corresponding physical erasing units. Also, when the host system is about to write data into a logical unit or update the data stored in a logical unit, the memory control circuit unit 104 (or memory management circuit 202) may select a physical erasing unit to write the data for substituting the physical erasing units of the data area 502. In the present exemplary embodiment, the logical sub-unit may be a logical page or a logical sector.

In order to recognize that in which physical erasing unit the data of each logical unit is stored, in the present exemplary embodiment, the memory control circuit unit 104 (or memory management circuit 202) may record the mapping relation between logical units and physical erasing units. Also, when the host system 1000 is about to access data from a logical sub-units, the memory control circuit unit 104 (or memory management circuit) may identify that to which logical unit this logical sub-unit belongs, and access data from the physical erasing unit mapped to this logical unit. For example, in the present exemplary embodiment, memory control circuit unit 104 (or memory management circuit 202) may save a logical address-physical address mapping table in the rewritable non-volatile module 106 to record the physical erasing units mapped to each logical units, and the memory control circuit unit 104 (or memory management circuit 202) may load the logical address-physical address mapping table into the buffer memory 208 for maintaining when it is about to access data.

It should be mentioned that, because the limited capacity of the buffer memory 208 cannot record the mapping tables of mapping relation of all logical units, in the present exemplary embodiment, the memory control circuit unit 104 (or memory management circuit 202) may group the logical units LBA(0)~LBA(H) into a plurality of logical areas LZ(0)~LZ(M), and may configure a logical address-physical address mapping table for each logical area. Particularly, when the memory control circuit unit 104 (or memory management circuit 202) is about to update a mapping of some logical units, the corresponding logical address-physical address mapping table of the logical area to which this logical unit belongs may be loaded into the buffer memory 208 to be updated.

As the foregoing description, in the present exemplary embodiment, the rewritable non-volatile memory module 106 of the memory apparatus 100 performs the management based on the page or the programming unit, so that when performing a write command, no matter what logical sub-unit of a logical unit the data is about to write into, the memory control circuit unit 104 (or memory management circuit 202) may write data with the manner that one physical programming unit by one physical programming unit (hereinafter, refer to the random write mechanism). Specifically, the memory control circuit unit 104 (or memory management circuit 202) may select an empty physical erasing unit as an active physical erasing unit to write the data. Also, when this active physical erasing unit is filled with the data, the memory control circuit unit 104 (or memory management circuit 202) may select another empty physical erasing unit from the spare area 504 as another active physical erasing unit for subsequently writing the data corresponding to the write command from the host system 1000. Particularly, for preventing the physical erasing units in the spare area 504 from exhausting, when the memory control circuit unit 104 (or memory management circuit 202) is about to select a physical erasing unit from the spare area 504 and the number of the physical erasing units in the spare area 504 goes down to a predetermined garbage collection threshold, the memory control circuit unit 104 (or memory management circuit 202) may perform a data merge process first to let the data of at least one physical erasing unit in the data area 502 become invalid data, and associate the physical erasing unit, in which all data is stored is invalid data, from the data area 502 to the spare area 504 such that the number of the physical erasing units in the spare area 504 will be larger than the predetermined garbage collection threshold. For example, when performing the data merge process, the memory control circuit unit 104 (or memory management circuit 202) at least needs to use one empty physical erasing unit, so that the garbage collection threshold is set to be a number larger than 1.

FIGS. 8~20 are diagrams illustrating an example of writing data according to one embodiment of the present invention.

Figure 8:
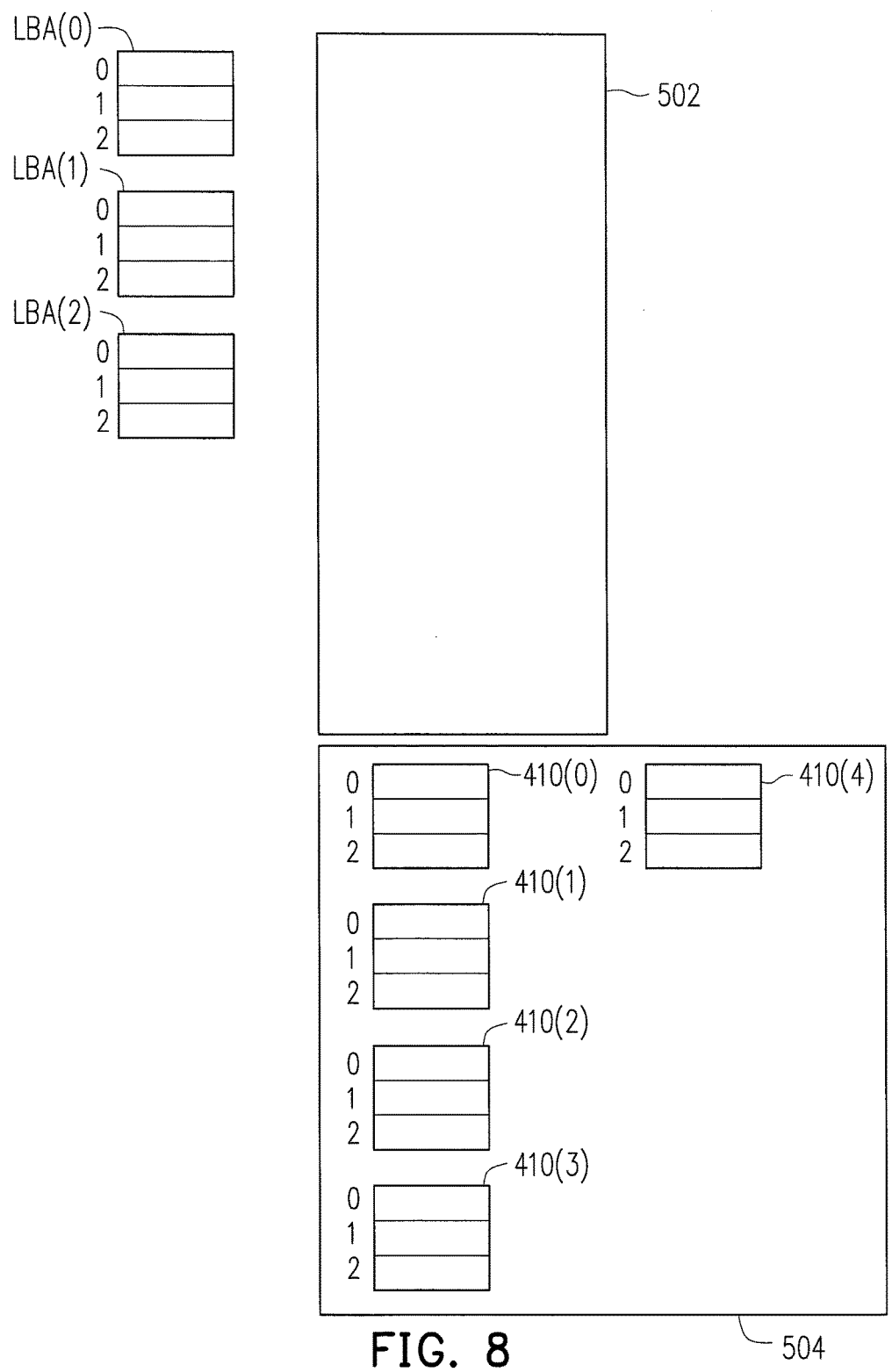
FIGS. 8-20 are diagrams illustrating an example of writing data according to one embodiment of the present invention.

Referring to FIG. 8, for ease of description, it assumed that there is no physical erasing units mapped to the logical unit at the beginning (i.e., the memory storage apparatus 100 is never written with the user data after setting up the memory modules) in the data area 502, there is five physical erasing units in the spare area 504, each physical erasing unit has three physical programming units, and the data to be written into each physical erasing unit must be written by the order of the physical programming units. Moreover, it assumed that the memory control circuit unit 104 (or memory management circuit 202) may configure three logical units for the host system 1000 to access, and set the value of the garbage collection threshold to be 1, wherein each logical unit has three logical sub-units and the capacity of each logical sub-unit is equal to the capacity of one physical erasing unit.

Figure 9:
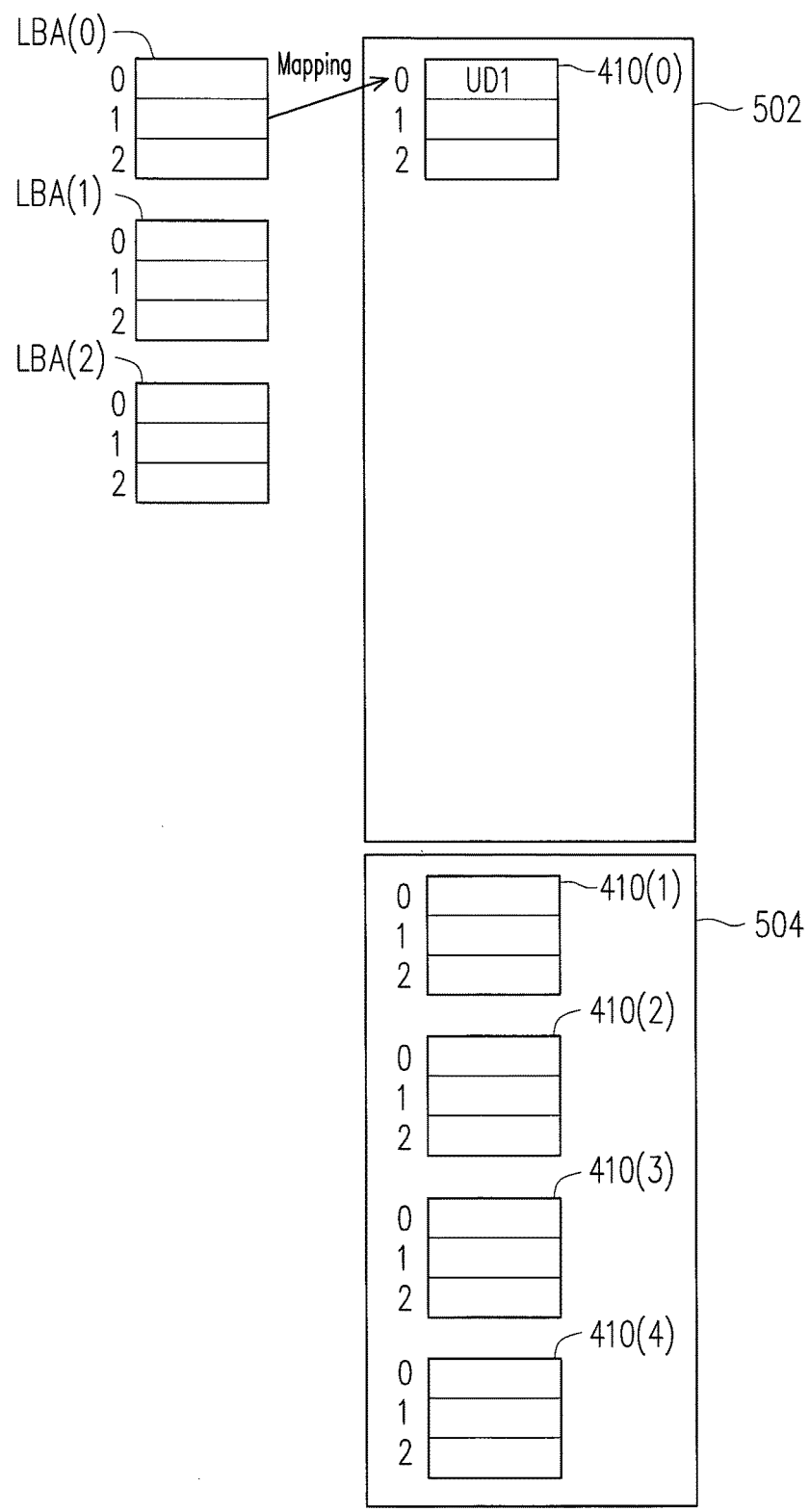

Referring to FIG. 9, it assumed that when data UD1 is to be programmed and data UD1 belongs to the 1st logical sub-unit of the logical unit LBA(0), the memory control circuit unit 104 (or memory management circuit 202) may select a physical erasing unit 410(0) from the spare area 504, issue a program command to write data UD1 into the 0th physical programming unit of the physical erasing unit 410(0) and associate the physical erasing unit 410(0) with the data area 502.

Figure 10:
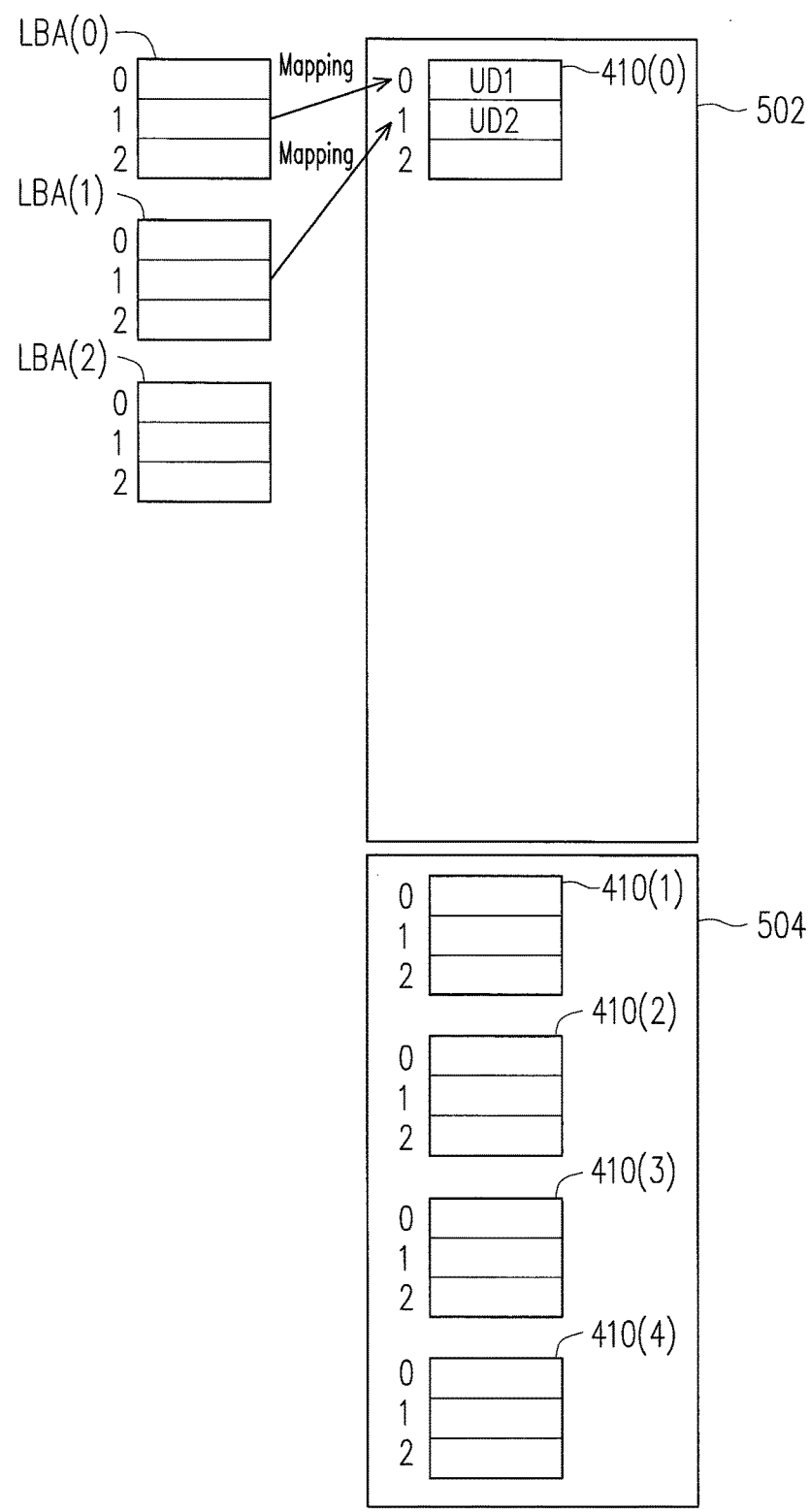

Referring to FIG. 10, and continuing on FIG. 9, assuming that when there is also data UD2 to be programmed and the data UD2 belongs to the 0th logical sub-unit of the logical unit LBA(1), the memory control circuit unit 104 (or memory management circuit 202) may issue a program command to write the data UD2 into the 1st physical programming unit of the physical erasing unit 410(0).

Figure 11:
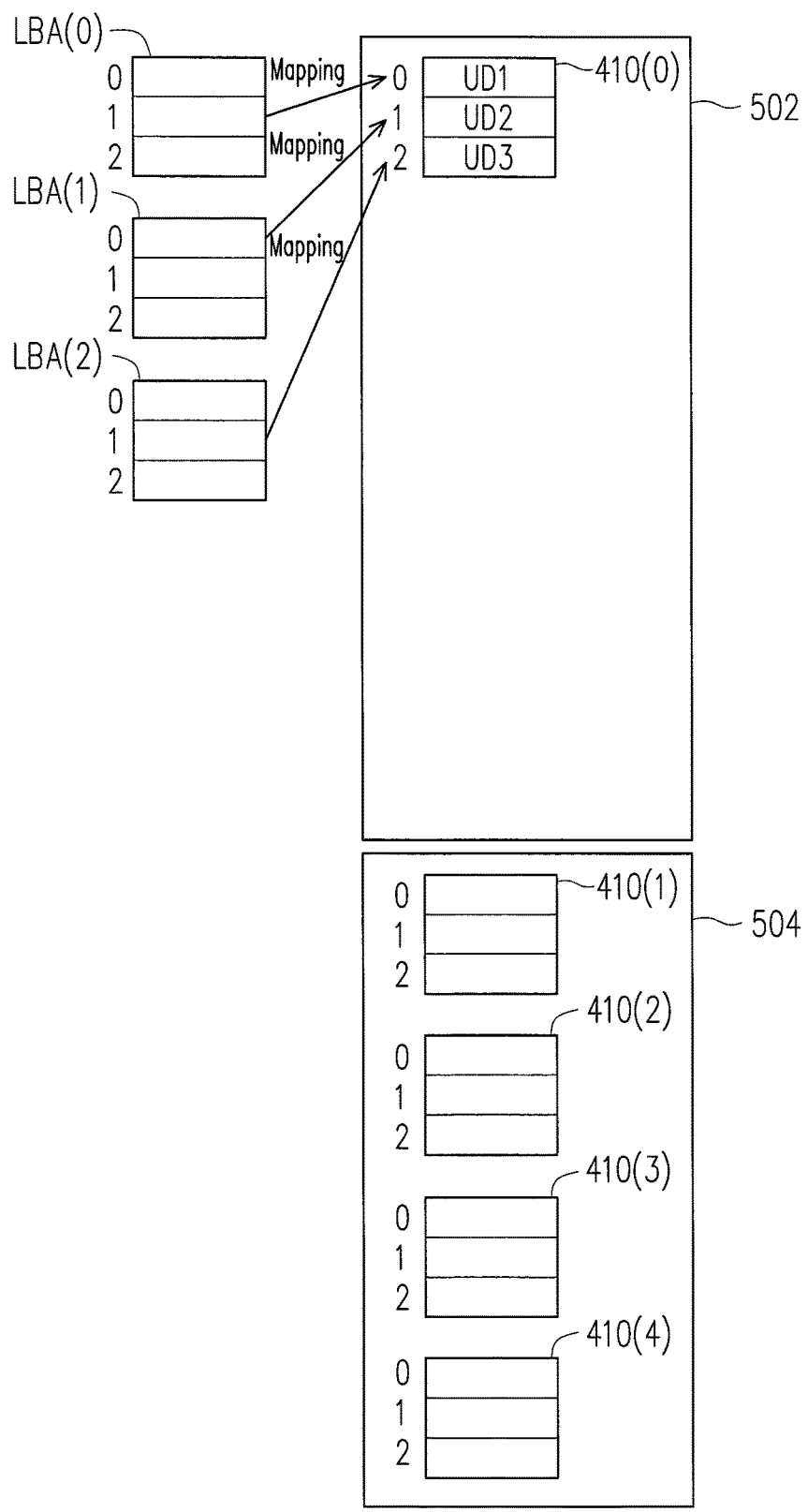

Referring to FIG. 11, and continuing on FIG. 10, assuming when there is also data UD3 to be programmed and the data UD3 belongs to the 1st logical sub-unit of the logical unit LBA(2), the memory control circuit unit 104 (or memory management circuit 202) may issue a program command to write the data UD3 into the 2nd physical programming unit of the physical erasing unit 410(0).

Figure 12:
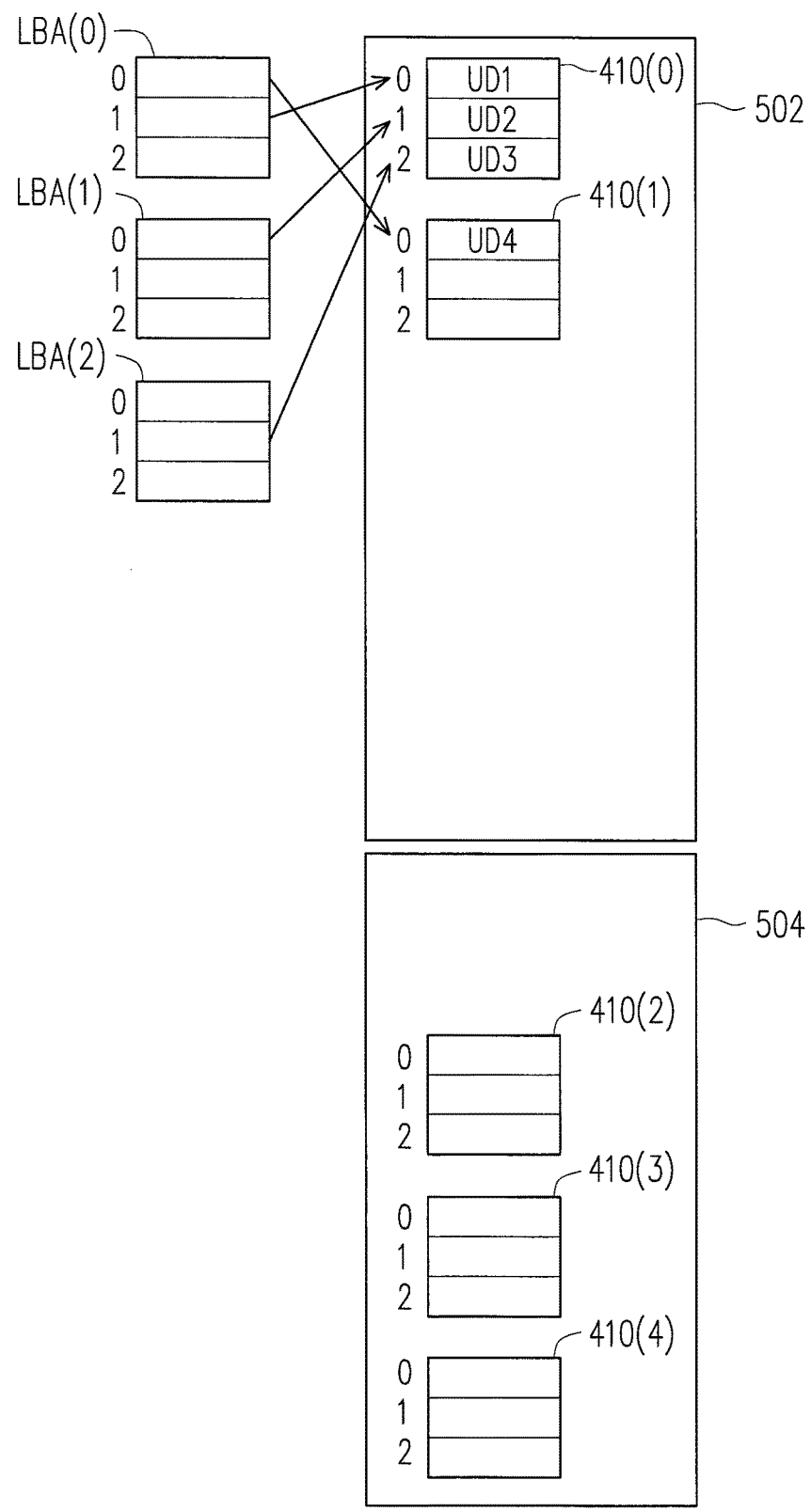

Referring to FIG. 12, and continuing on FIG. 11, it assumed that when there is also data UD4 to be programmed and data UD4 belongs to the 0th logical sub-unit of the logical unit LBA(0), because the physical erasing unit 410(0) has no space for writing, the memory control circuit unit 104 (or memory management circuit 202) may select a physical erasing unit 410(1) from the spare area 504, issue a program command to write data UD4 into the 0th physical programming unit of the physical erasing unit 410(1) and associate the physical erasing unit 410(1) with the data area 502.

Figure 13:
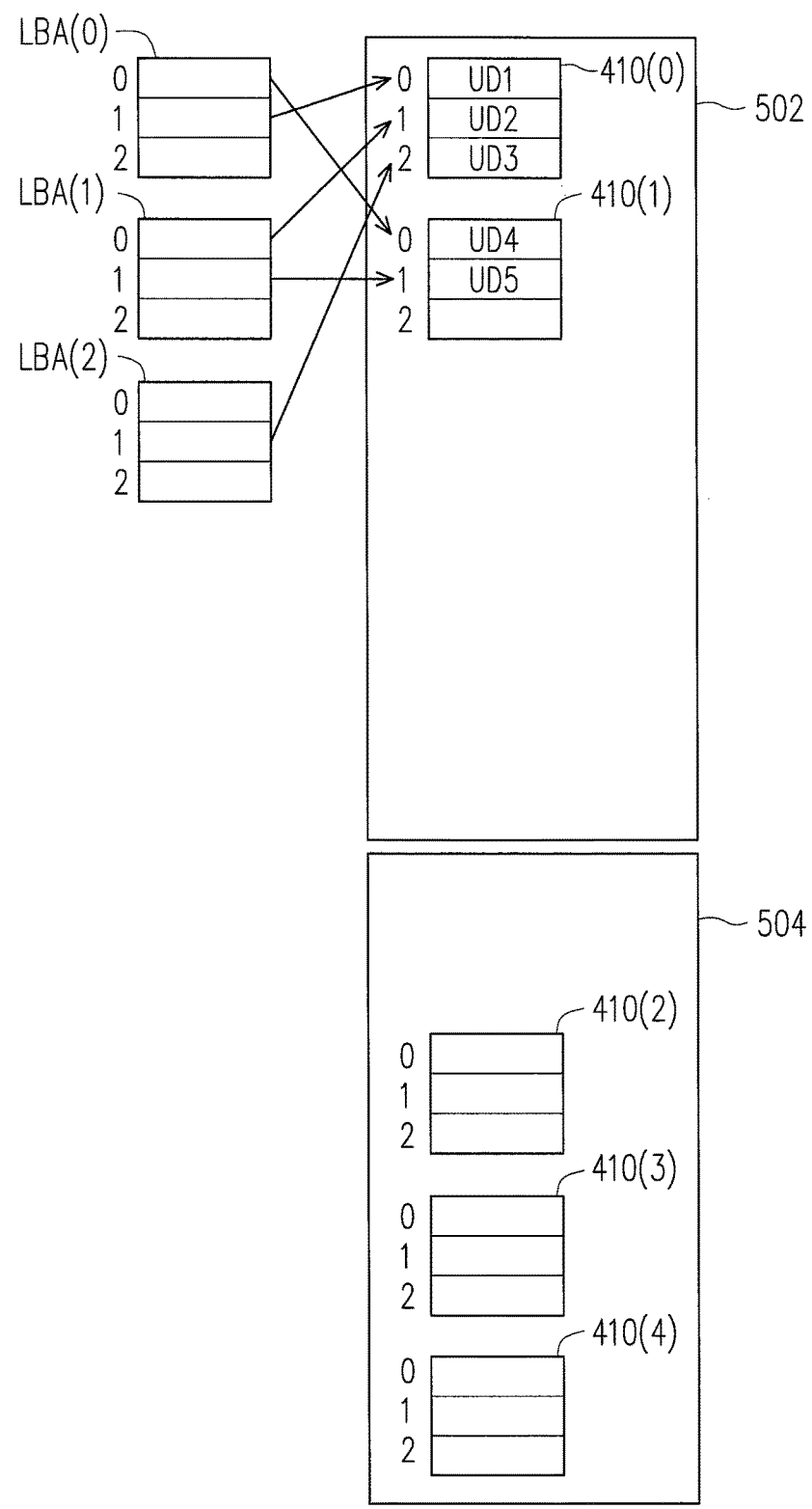

Referring to FIG. 13, and continuing on FIG. 12, assuming when there is also data UD5 to be programmed and the data UD5 belongs to the 1st logical sub-unit of the logical unit LBA(1), the memory control circuit unit 104 (or memory management circuit 202) may issue a program command to write the data UD5 into the 1st physical programming unit of the physical erasing unit 410(1).

Figure 14:
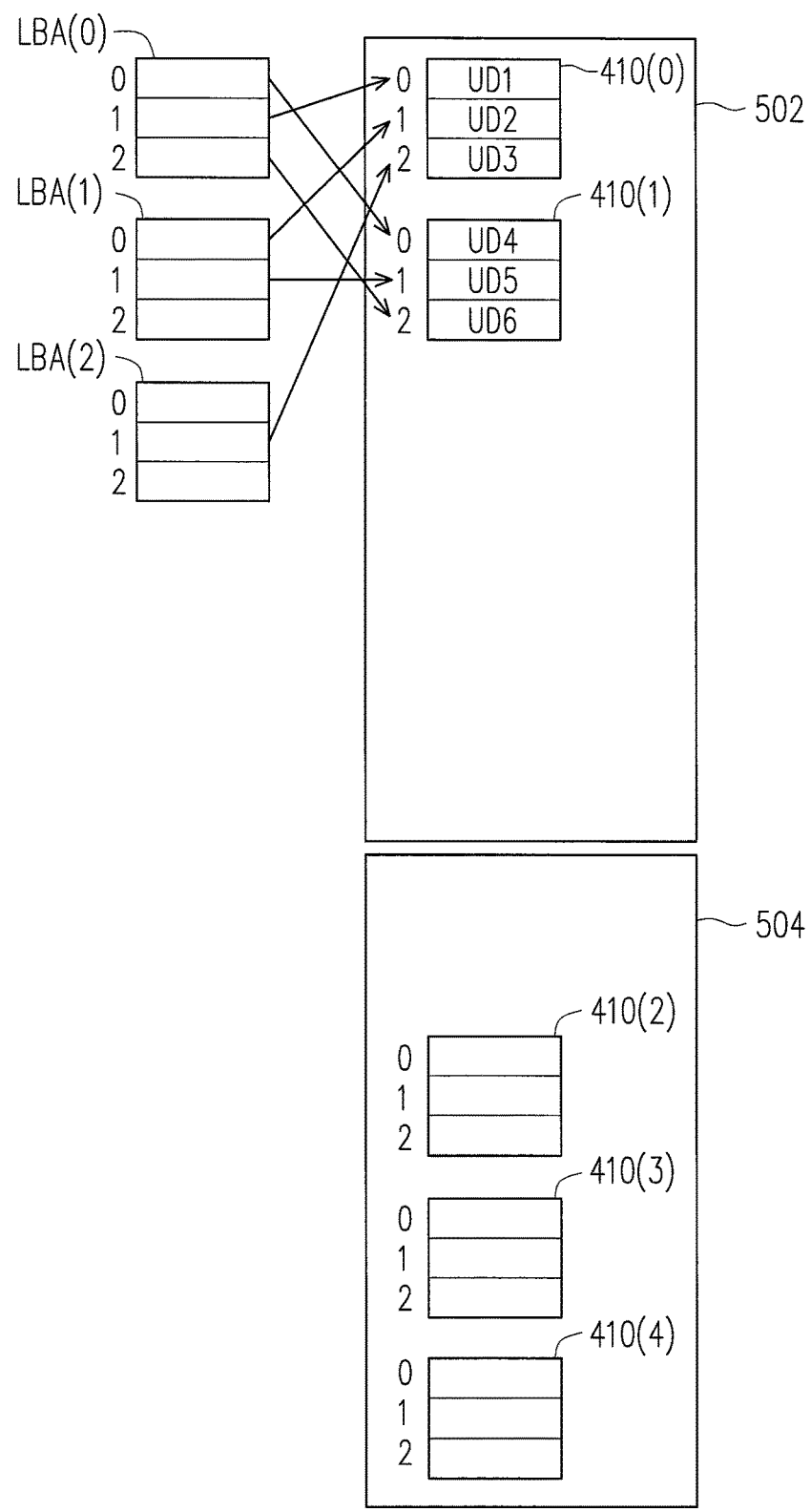

Referring to FIG. 14, and continuing on FIG. 13, assuming when there is also data UD6 to be programmed and the data UD6 belongs to the 2nd logical sub-unit of the logical unit LBA(0), the memory control circuit unit 104 (or memory management circuit 202) may issue a program command to write the data UD6 into the 2nd physical programming unit of the physical erasing unit 410(1).

Figure 15:
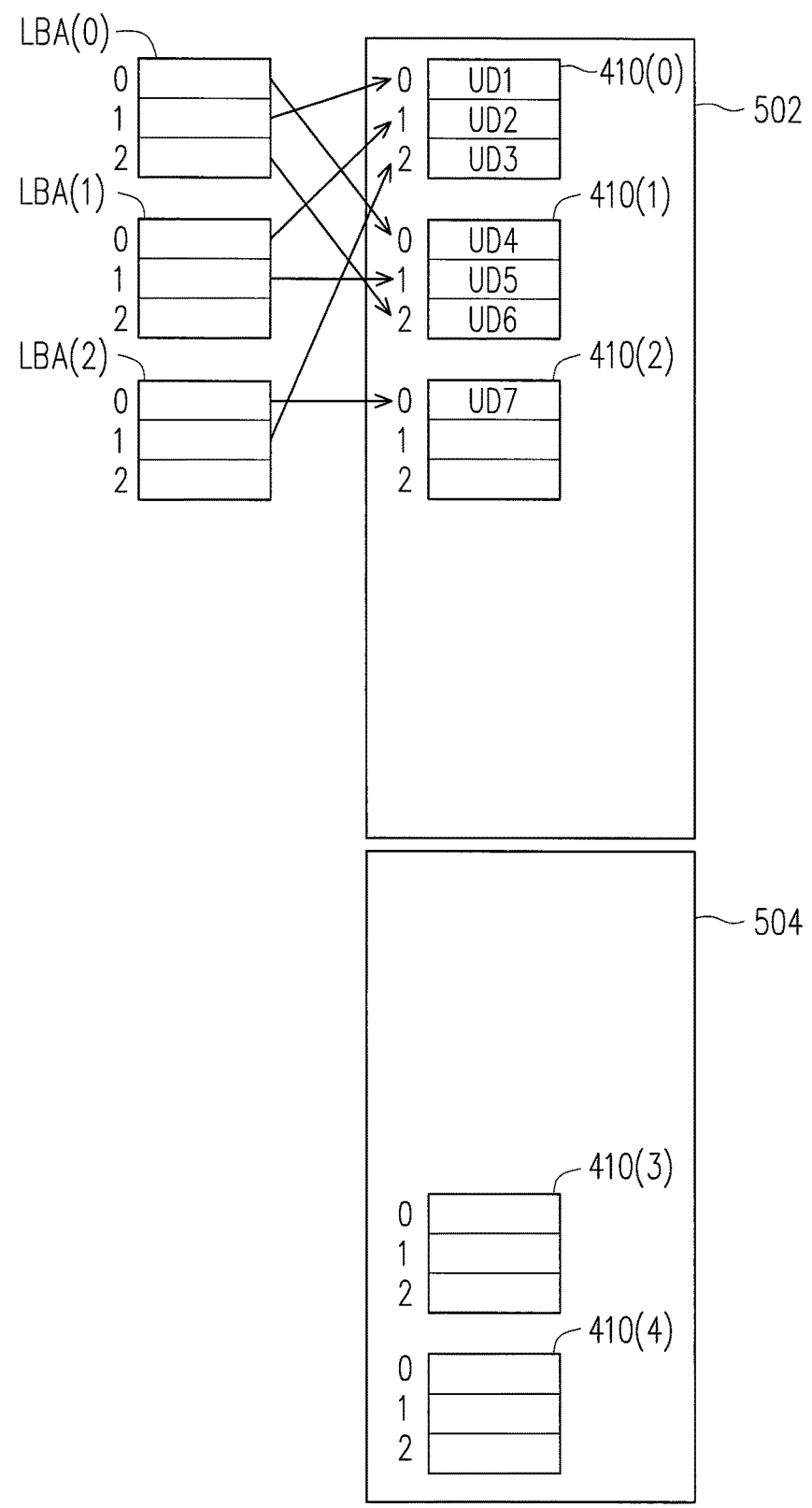

Referring to FIG. 15, and continuing on FIG. 14, it assumed that when there is also data UD7 to be programmed and data UD7 belongs to the 0th logical sub-unit of the logical unit LBA(2), because the physical erasing unit 410(1) has no space for writing, the memory control circuit unit 104 (or memory management circuit 202) may select a physical erasing unit 410(2) from the spare area 504, issue a program command to write data UD7 into the 0th physical programming unit of the physical erasing unit 410(2) and associate the physical erasing unit 410(2) with the data area 502.

Figure 16:
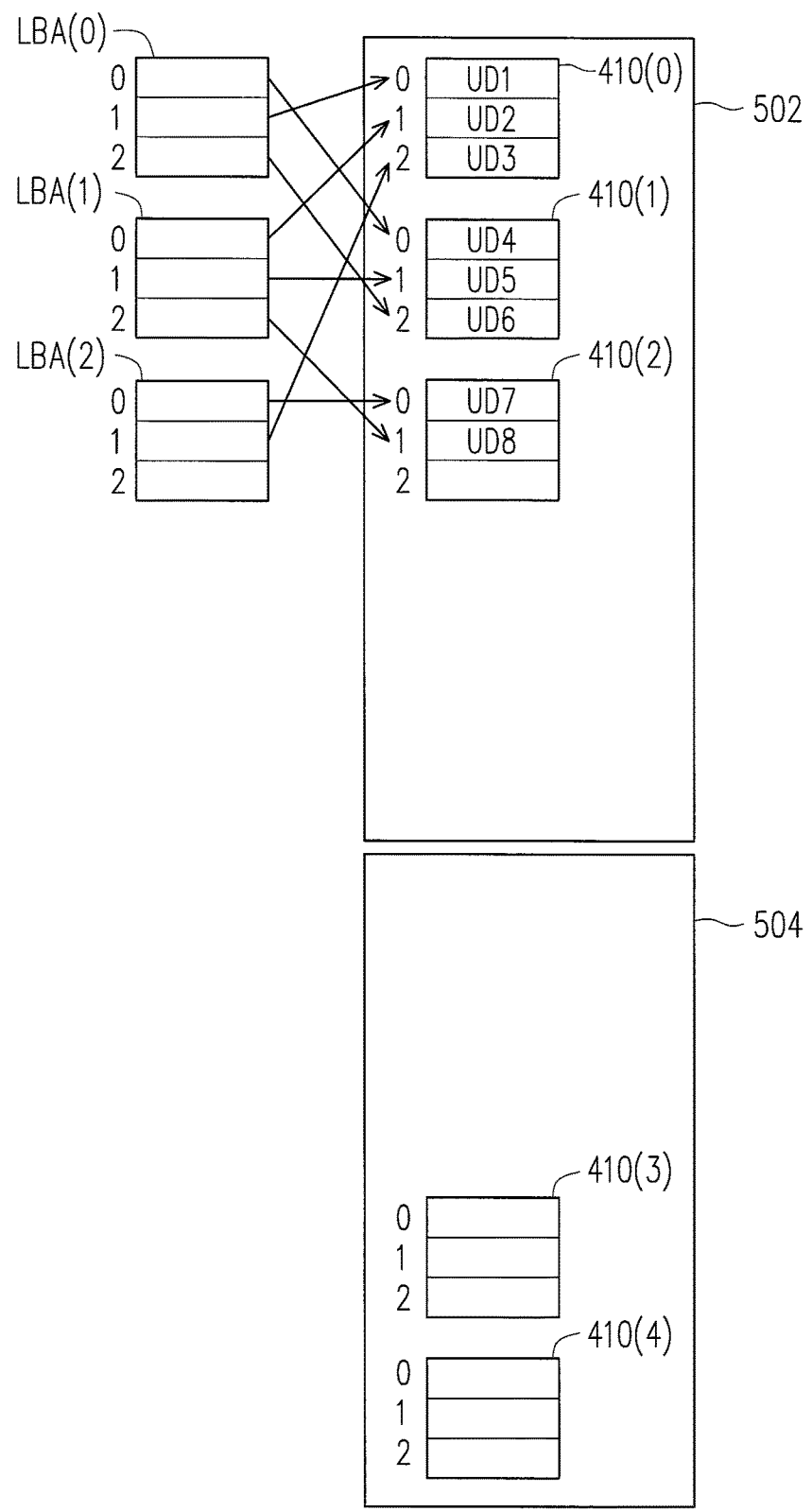

Referring to FIG. 16, and continuing on FIG. 15, assuming when there is also data UD8 to be programmed and the data UD8 belongs to the 2nd logical sub-unit of the logical unit LBA(1), the memory control circuit unit 104 (or memory management circuit 202) may issue a program command to write the data UD8 into the 1st physical programming unit of the physical erasing unit 410(2).

Figure 17:
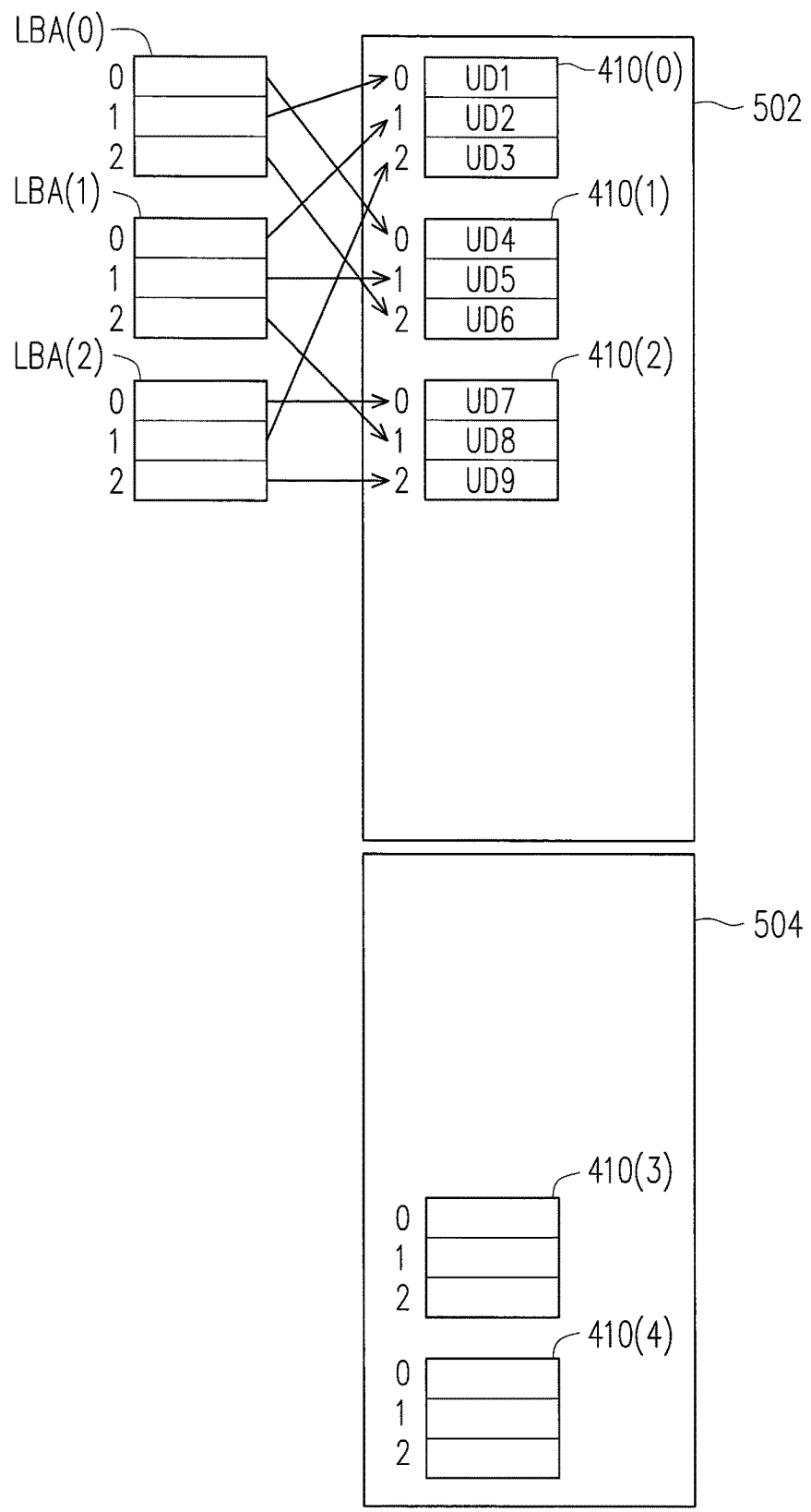

Referring to FIG. 17, and continuing on FIG. 16, assuming when there is also data UD9 to be programmed and the data UD9 belongs to the 2nd logical sub-unit of the logical unit LBA(2), the memory control circuit unit 104 (or memory management circuit 202) may issue a program command to write the data UD9 into the 2nd physical programming unit of the physical erasing unit 410(2).

Figure 18:
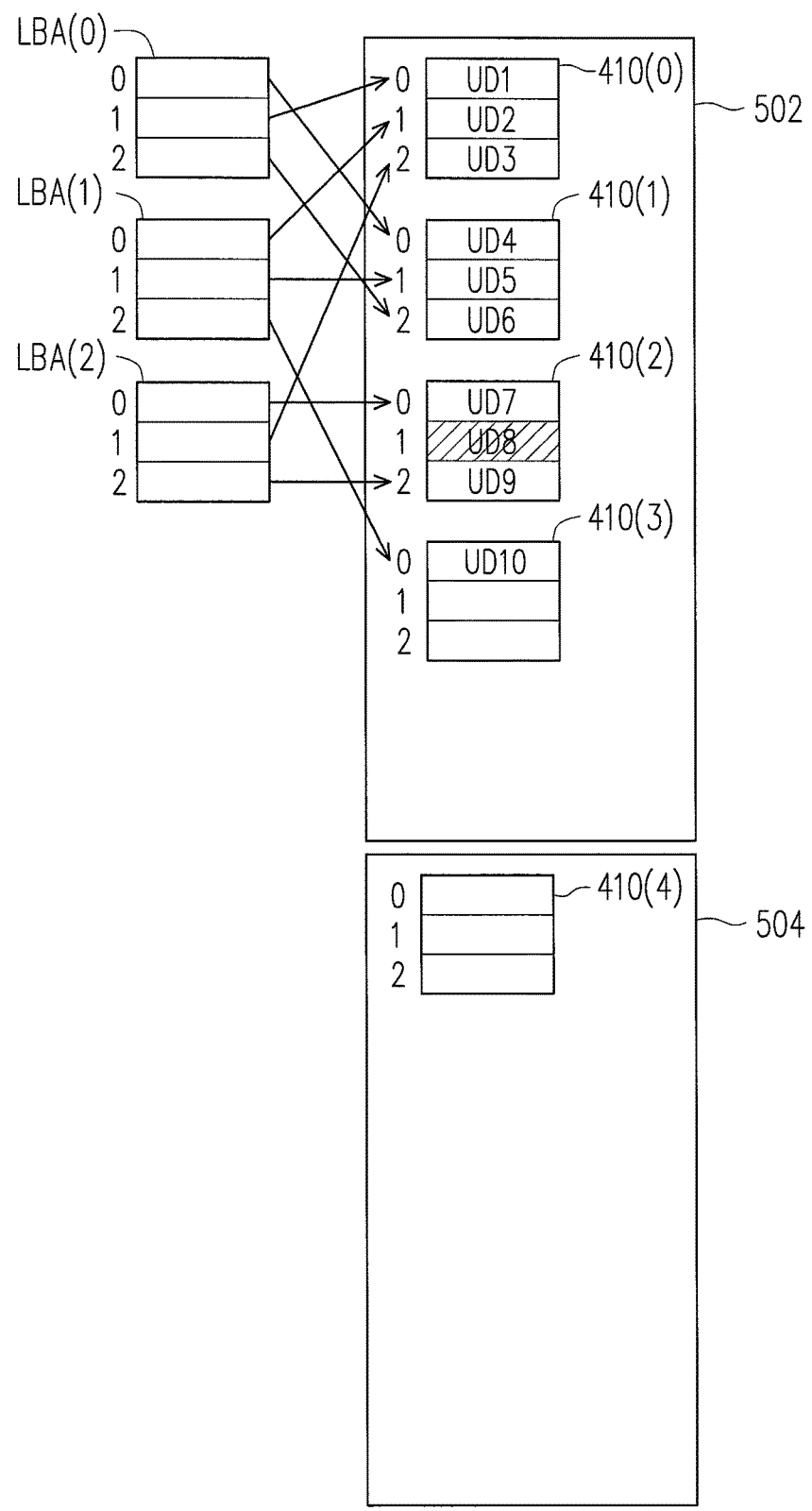

Referring to FIG. 18, and continuing on FIG. 17, it assumed that when there is also data UD10 to be programmed and data UD10 belongs to the 2nd logical sub-unit of the logical unit LBA(1), because the physical erasing unit 410(2) has no space for writing, the memory control circuit unit 104 (or memory management circuit 202) may select a physical erasing unit 410(3) from the spare area 504, issue a program command to write data UD10 into the 0th physical programming unit of the physical erasing unit 410(3) and associate the physical erasing unit 410(3) with the data area 502, wherein the 1st physical programming unit of the physical erasing unit 410(2) will be marked as being in an invalid data status (illustrated as the dotted line).

Figure 19:
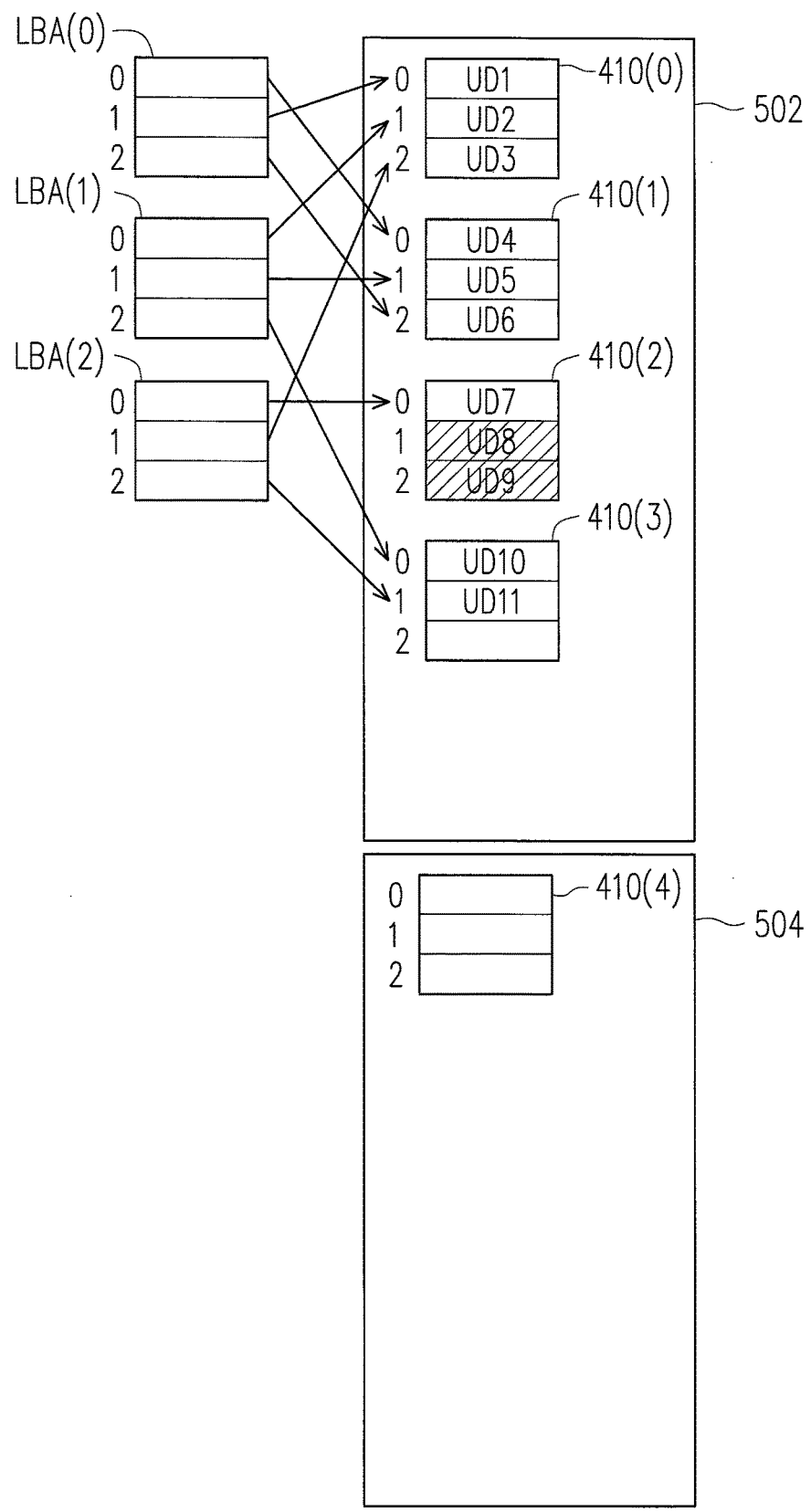

Referring to FIG. 19, and continuing on FIG. 18, assuming when there is also data UD11 to be programmed and the data UD11 belongs to the 2nd logical sub-unit of the logical unit LBA(2), the memory control circuit unit 104 (or memory management circuit 202) may issue a program command to write the data UD11 into the 1st physical programming unit of the physical erasing unit 410(3), wherein the 2nd physical programming unit of the physical erasing unit 410(2) will be marked as being in an invalid data status (illustrated as the dotted line).

Figure 20:
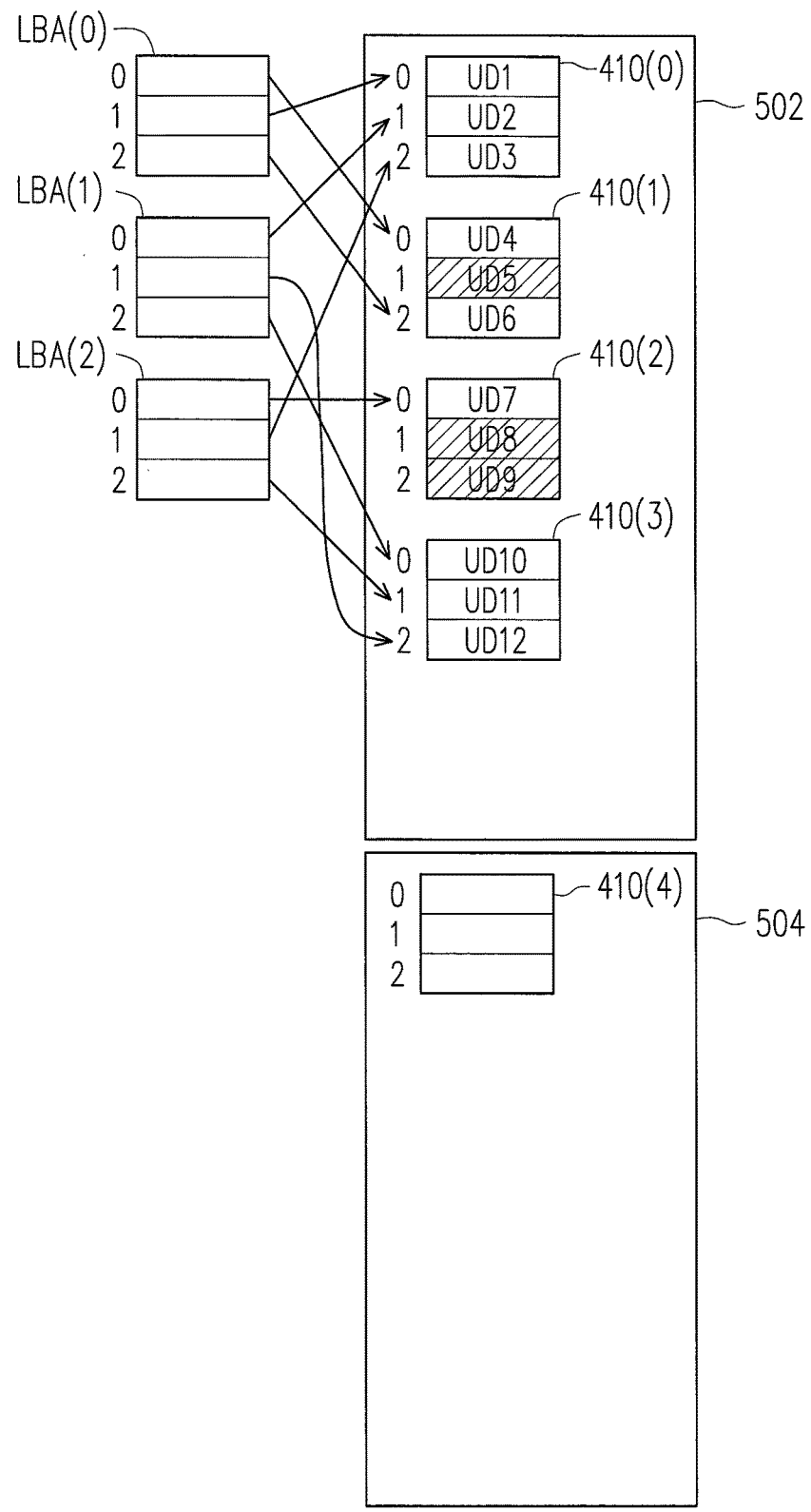

Referring to FIG. 20, and continuing on FIG. 19, assuming when there is also data UD12 to be programmed and the data UD12 belongs to the 1st logical sub-unit of the logical unit LBA(1), the memory control circuit unit 104 (or memory management circuit 202) may issue a program command to write the data UD12 into the 2nd physical programming unit of the physical erasing unit 410(3), wherein the 1st physical programming unit of the physical erasing unit 410(1) will be marked as being in an invalid data status (illustrated as the dotted line).

That is, no matter what logical sub-unit of the logical unit the host system 1000 is about to save into, the memory control circuit unit 104 (or memory management circuit 202) may write the data, which the host system 1000 is about to save, into the active physical erasing unit in sequence. Particularly, when the number of the physical erasing units in the spare area 504 is not larger than 3, the memory control circuit unit 104 (or memory management circuit 202) may perform a data merge process while executing a write command to prevent the physical erasing units of the spare 504 area from exhausting.

Figure 21:
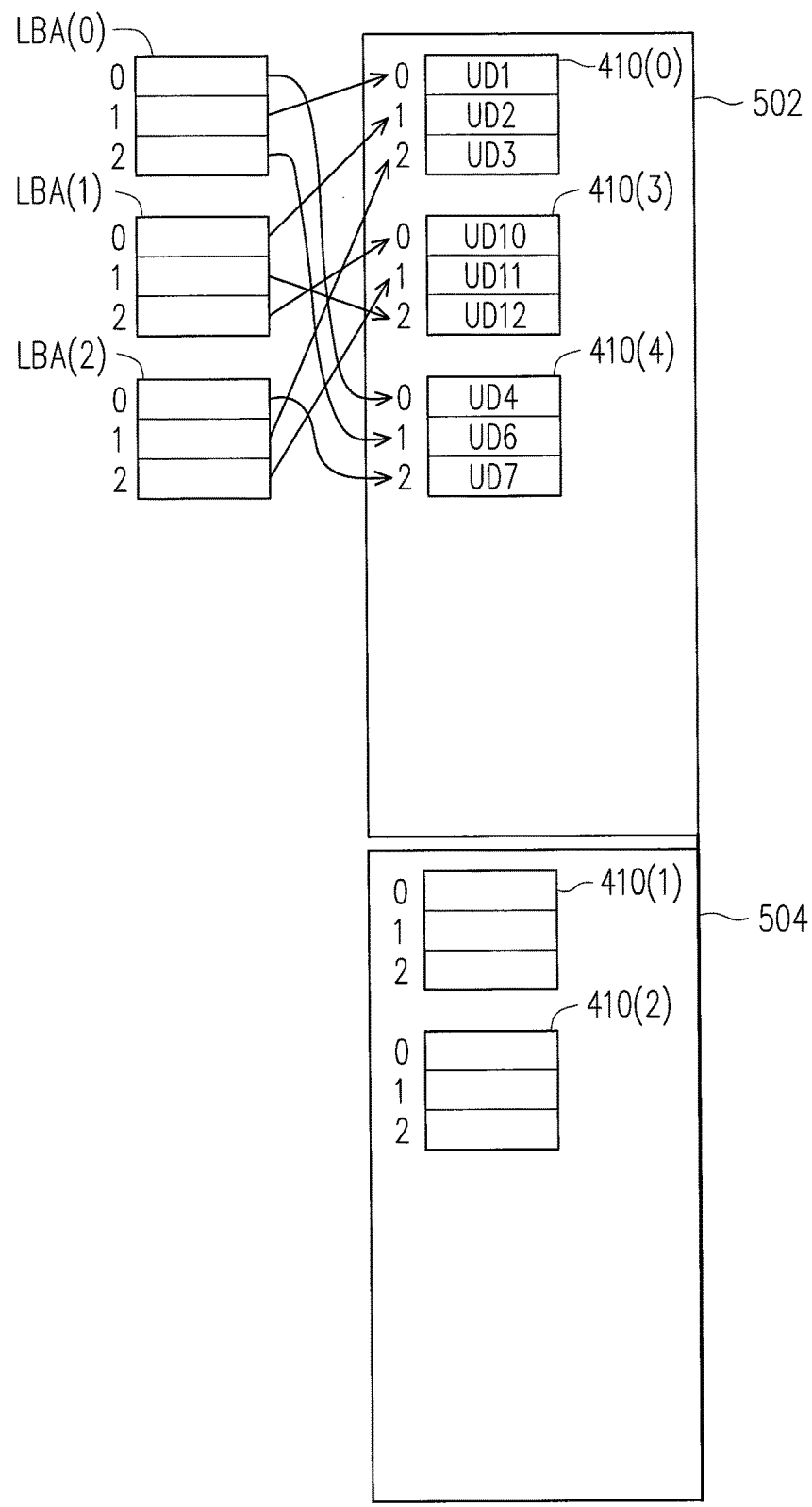
FIG. 21 and FIG. 22 are diagrams illustrating a simplified exemplary embodiment of performing valid data merge process to finish following write command.
Figure 22:
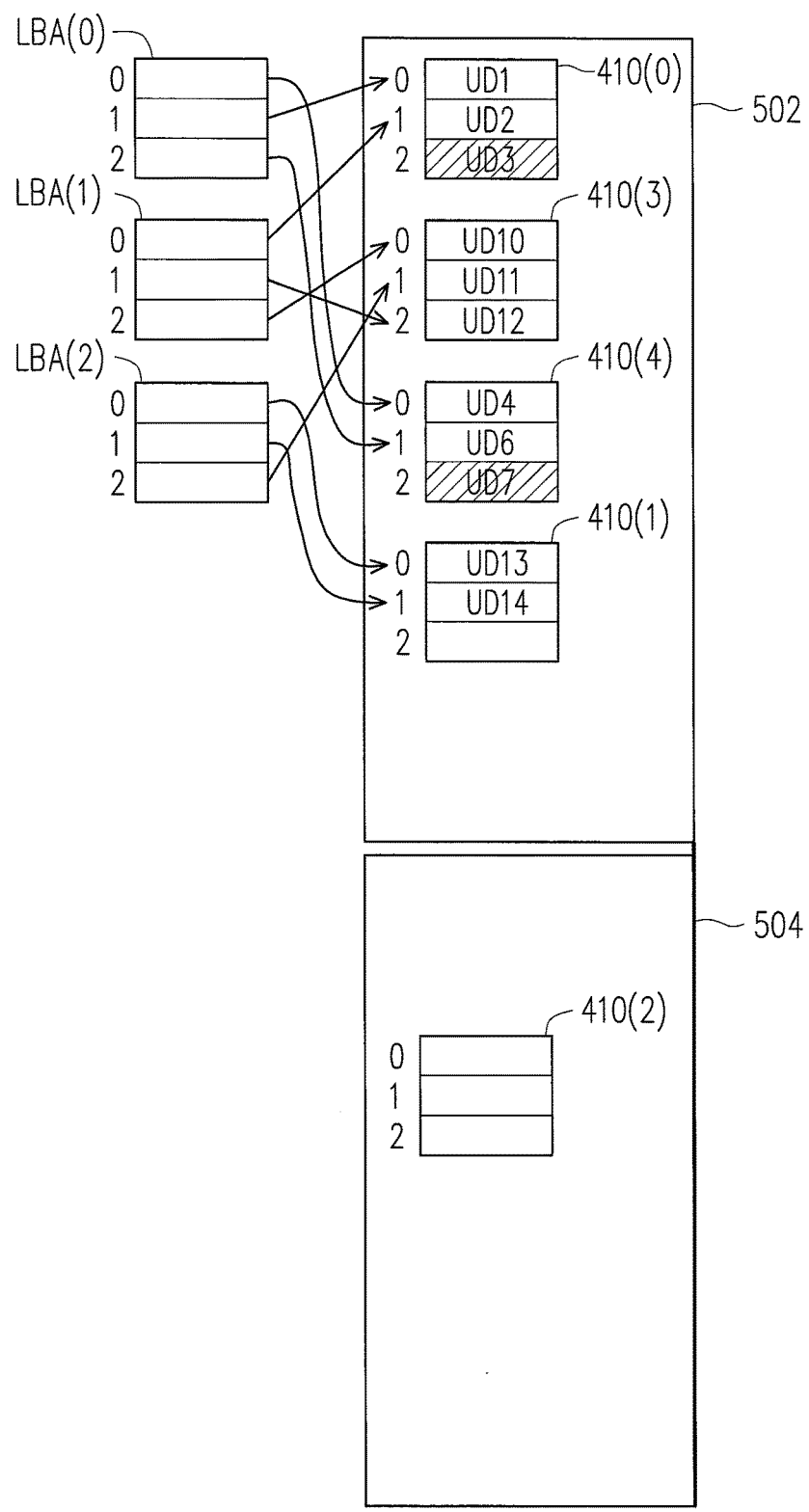

FIG. 21 and FIG. 22 are diagrams illustrating a simplified exemplary embodiment of performing valid data merge process to finish the following write command.

Continuing FIG. 20, assuming when there is also data UD13 and data UD14 to be programmed and data UD13 and data UD14 belongs to the 0th and 1st logical sub-units of the logical unit LBA(2), because the physical erasing unit 410(3) has no space for writing, the memory control circuit unit 104 (or memory management circuit 202) needs to select an empty physical erasing unit from the spare area 504. However, in the meantime, the number of the physical erasing units in the spare area 504 is not larger than the garbage collection threshold, so that the memory control circuit unit 104 (or memory management circuit 202) must perform the data merge process first.

Referring to FIG. 21, for example, the memory control circuit unit 104 (or memory management circuit 202) selects the physical erasing unit 410(4) from the spare area 504, copies the valid data in the physical erasing unit 410(1) (i.e., data UD4 and data UD6) and the valid data in the physical erasing unit 410(2) (i.e., data UD7) to the physical erasing unit 410(4), associates the physical erasing unit 410(4) to the data area 502, marks the 0th and 2nd physical programming units of the physical erasing unit 410(1) and the 0th physical programming unit of the physical erasing unit 410(2) as being in the invalid status, performs the physical erasing to the physical erasing units only stored invalid data (i.e., physical erasing unit 410(1) and physical erasing unit 410(2)), and associates the erased physical erasing unit with the spare area 504. At this time, the number of physical erasing units in the spare area 504 will recover to 2 (larger than the garbage collection threshold)

Referring to FIG. 22, afterward, the memory control circuit unit 104 (or memory management circuit 202) may select the physical erasing unit 410(1) from the spare area 504, issue the program command to write the data UD13 and the data UD14 into the 0th and 1st physical programming units of the physical erasing unit 410(1) and associate the physical erasing unit 410(1) with the data area 502, wherein the physical programming units mapped to the 0th and 1st logical sub-units of the logical unit LBA(2) before (i.e., the 2nd physical programming unit of the physical erasing unit 410(0) and the 2nd physical programming unit of the physical erasing unit 410(4)) will be marked as being in the invalid data status.

In the present exemplary embodiment, the memory control circuit unit 104 (or memory management circuit 202) may determine whether it receives a predetermined command for performing on a logical sub-unit from the host system 1000 or not. Particularly, when determining that it receives the predetermined command, the memory control circuit unit 104 (or memory management circuit 202) may record a mark in response to a special area of the physical erasing unit mapped to this logical sub-unit, and perform the foregoing data merge process to the physical erasing unit mapped to this logical sub-unit according to the mark, and then perform the physical erasing operation to this physical erasing unit such that the data belongs to this logical sub-unit may totally be removed from the memory storage apparatus 100. For example, when determining that it receives the predetermined command, the memory control circuit unit 104 (or memory management circuit 202) may record the physical erasing unit mapped to this logical sub-unit in a garbage collection table, and then perform the foregoing data merge process to the physical erasing unit mapped to this logical sub-unit according to the garbage collection table.

For example, in an exemplary embodiment, the garbage collection table may be built by a plurality of tables, wherein one table records the mapping relation between logical sub-units and physical programming units, and another table records the subordinate relation between the physical programming units and the physical erasing units. Accordingly, the memory control circuit unit 104 (or memory management circuit 202) may recognize that the physical erasing unit to which a physical programming unit mapped to a logical sub-unit belongs through the garbage collection table.

For example, in an exemplary embodiment of the present invention, the foregoing predetermined command is the trim command for indicating what data is not to be used any more. It should be mentioned that, in another exemplary embodiment, the predetermined command may also be the delete command, the remove command, the robocopy command, the specific data write command or other commands for indicating what data is not to be used any more. Specifically, the memory control circuit unit 104 (or memory management circuit 202) may recognize the invalid data logical sub-units of in the logical unit according to the trim command issued by the host system 1000, and determine the physical programming unit mapped to the invalid data logical sub-unit as an empty one. Here, the invalid data logical sub-unit refers to the logical sub-unit of which data is deleted by the host system 1000 through the file allocation table, and the host system 1000 may, through the file system, identify that the data in this logical sub-unit is not to be considered to be used and this logical sub-unit may be written with new data. In the exemplary embodiment, the file system may be, for example, the file allocation table, NTFS of window operation system, HFS of Mac operation system (OS X), Ext of Linux, and so on. In the present exemplary embodiment, when the operation system of the host system 1000 is Window 7 of Microsoft, the host system 1000 may inform the memory storage apparatus 100 with trim command that which data in the logical sub-unit is the invalid data. That is, after the host system 1000 deletes the data and informing the memory storage apparatus 100 through the trim command, the memory control circuit unit 104 (or memory management circuit 202) may record the physical erasing unit mapped to this logical sub-unit in the garbage collection table. Afterward, the memory control circuit unit 104 (or memory management circuit 202) may perform the data merge process to the physical erasing unit mapped to this logical sub-unit to actually erase the data of the logical sub-unit according to the garbage collection table such that it may prevent the host from determining that the deleted data still exists in the rewritable non-volatile memory module 106, and then the data has a chance to be stolen.

Figure 23:
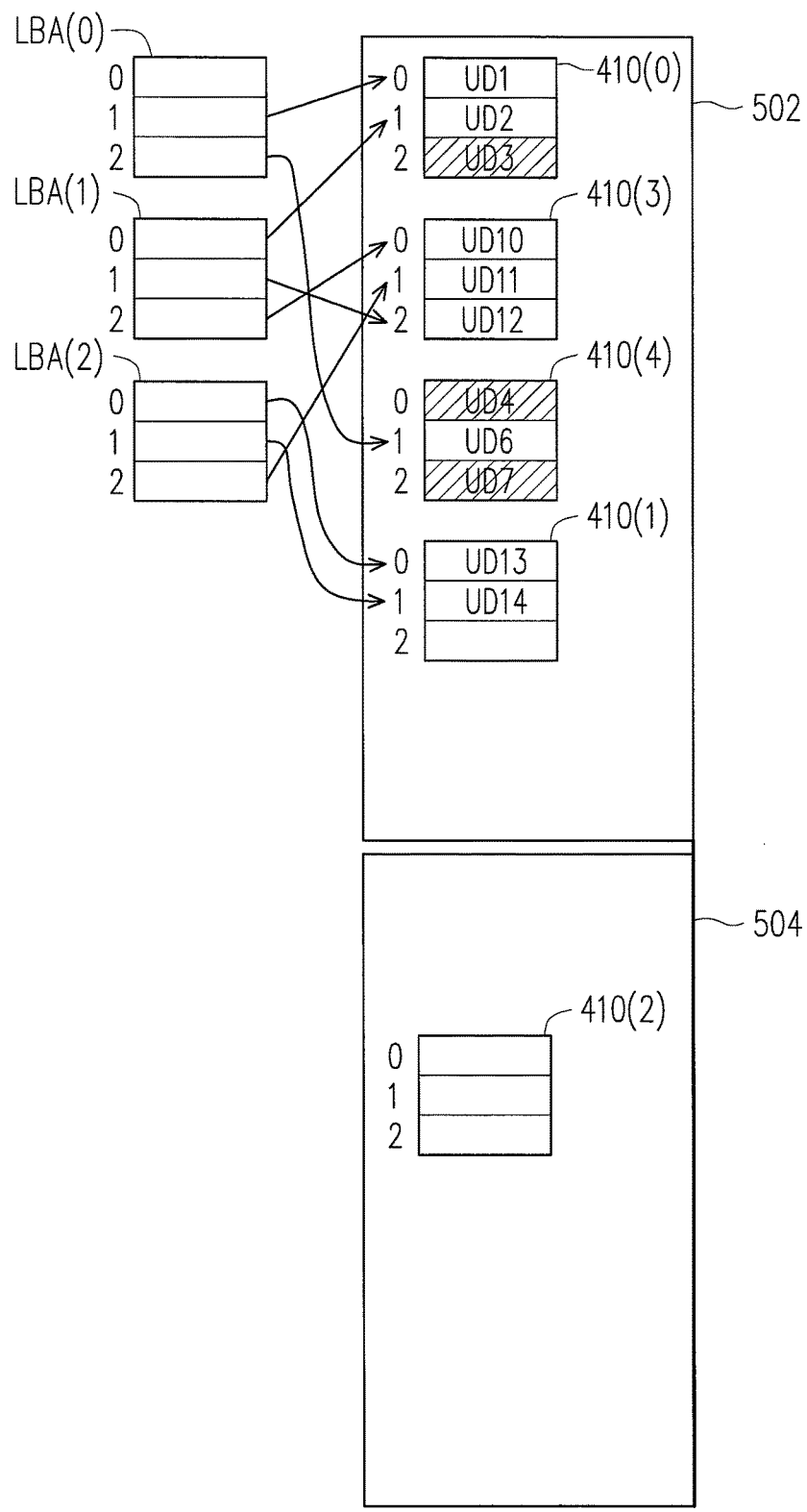
FIG. 23 and FIG. 24 are diagrams illustrating an exemplary operation after receiving the trim command according to an embodiment of the present invention.
Figure 24:
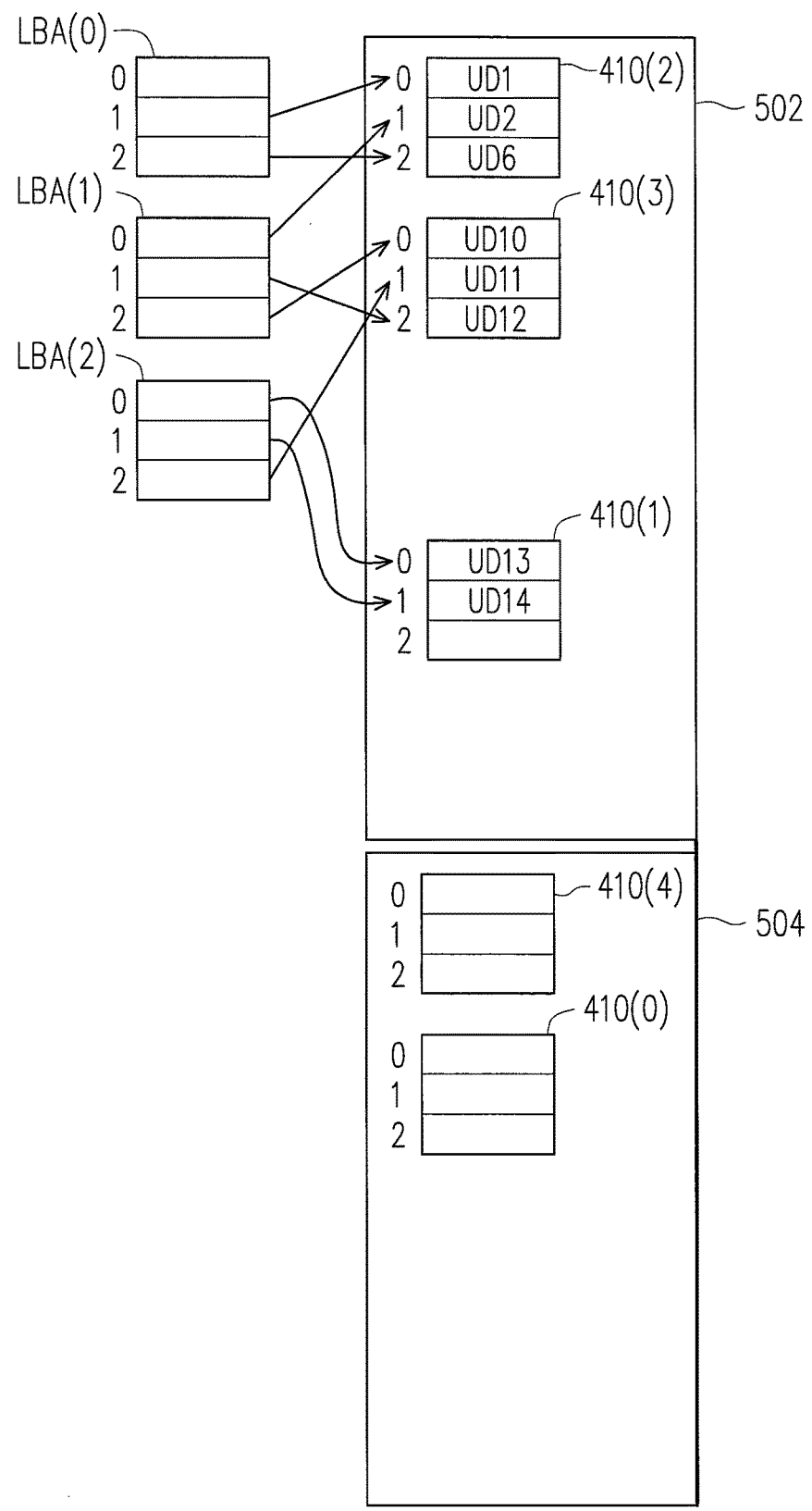

FIG. 23 and FIG. 24 are diagrams illustrating an exemplary operation after receiving the trim command according to an embodiment of the present invention.

Referring to FIG. 23, assuming that under the state in the FIG. 22, when the memory storage apparatus 100 receives the trim command and the trim command informs that the data in the 0th logical sub-unit of the logical unit LBA (0) is invalid data in the file allocation table, the memory control circuit unit 104 (or memory management circuit 202) may mark the physical programming unit mapped to the 0th logical sub-unit of the logical unit LBA(0) (i.e., the 0th physical programming unit of the physical erasing unit 410(4)) as being in the invalid status, and record a mark corresponding the physical erasing unit 410(4) in the garbage collection table in response to the received trim command. Moreover, for example, in another exemplary embodiment, the memory control circuit unit 104 (or memory management circuit 202) may further delete the mapping relation of the 0th logical sub-unit of the logical unit LBA(0) from the logical address-physical address mapping table.

Referring to FIG. 24, after marking the 0th physical programming unit of the physical erasing unit 410(4) as being in invalid status, the memory control circuit unit 104 (or memory management circuit 202) may select the physical erasing unit 410(2) from the spare area 504, copy the valid data in the physical erasing unit 410(0) (i.e., data UD1 and data UD2) and the valid data in the physical erasing unit 410(4) (i.e., data UD6) to the physical erasing unit 410(2), associate the physical erasing unit 410(2) with the data area 502, mark the 0th and 1st physical programming units of the physical erasing unit 410(0) and the 1st physical programming unit of the physical erasing unit 410(4) as being in the invalid status, perform the physical erasing operation to the physical erasing unit 410(0) and physical erasing unit 410(4), which store only the invalid data, and associate the erased physical erasing units with the spare area 504.

It should be mentioned that, the operation of performing a actually erasing to the invalid data through the data merge process may be performed after receiving the trim command immediately, or be performed in a background performing mode. Specifically, when the memory storage apparatus 100 receives the command from the host system 1000, the memory control circuit unit 104 (or memory management circuit 202) needs to execute it immediately and respond to the host system 1000 to prevent the time-out. Here, the mode of the process for responding the host system 1000 is referred to the foreground performing mode. In opposite, the memory control circuit unit 104 (or memory management circuit 202) may also perform operations, for example, a data moving, and so on, in the idle status (i.e., not receiving the commands sent from the host system 1000). Here, the mode of the process not for responding the host system 1000 is referred to the foreground performing mode.

For example, in the present exemplary embodiment, the memory control circuit unit 104 (or memory management circuit 202) may transmit a confirm message to the host system 1000 to indicate that it already finished the operation corresponding to the trim command. Accordingly, in an exemplary embodiment, the memory control circuit unit 104 (or memory management circuit 202) may perform the operation as illustrated in FIG. 24 before sending the confirm message, namely, perform the data merge process in the foreground performing mode to actually erase the data that the host system 1000 intends to delete. Or, in another exemplary embodiment, the memory control circuit unit 104 (or memory management circuit 202) may perform the operation as illustrated in FIG. 24 after sending the confirm message, namely, perform the data merge process in the background performing mode to actually erase the data that the host system 1000 is about to delete.

Moreover, it should be mentioned that, in the present exemplary embodiment, when determining that receiving the trim command, the memory control circuit unit 104 (or memory management circuit 202) actually erase the data that the host system 1000 is about to delete through the data merge process. However, the present invention is not limited thereto, in another exemplary embodiment, when receiving a write command for writing predetermined state data to logical sub-unit, the memory control circuit unit 104 (or memory management circuit 202) may also actually erase the data of the logical sub-unit through the data merge process. Here, the predetermined state data may be configured according to users' needs, and not to be limited.

For example, in an exemplary embodiment, the host system 1000 installed a security erasing application in advance, and when user uses the security erasing application for deleting data, the security erasing application sends predetermined command (for example, a trim command or a write command for writing predetermined state data to the logical sub-unit) to the memory storage apparatus 100 through the host system 1000.

Figure 25:
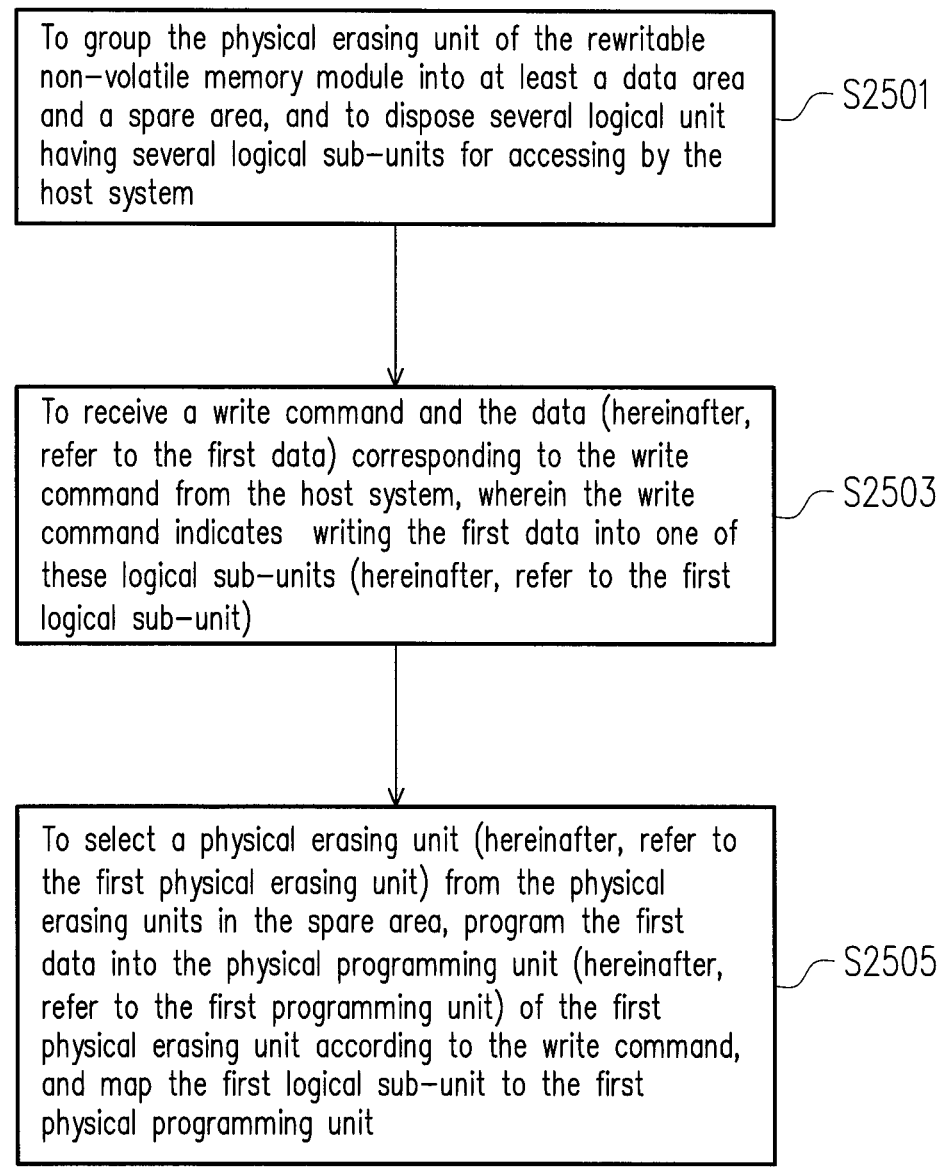
FIG. 25 and FIG. 26 are flowcharts illustrating a data erasing method according to an exemplary embodiment of the present invention.
Figure 26:
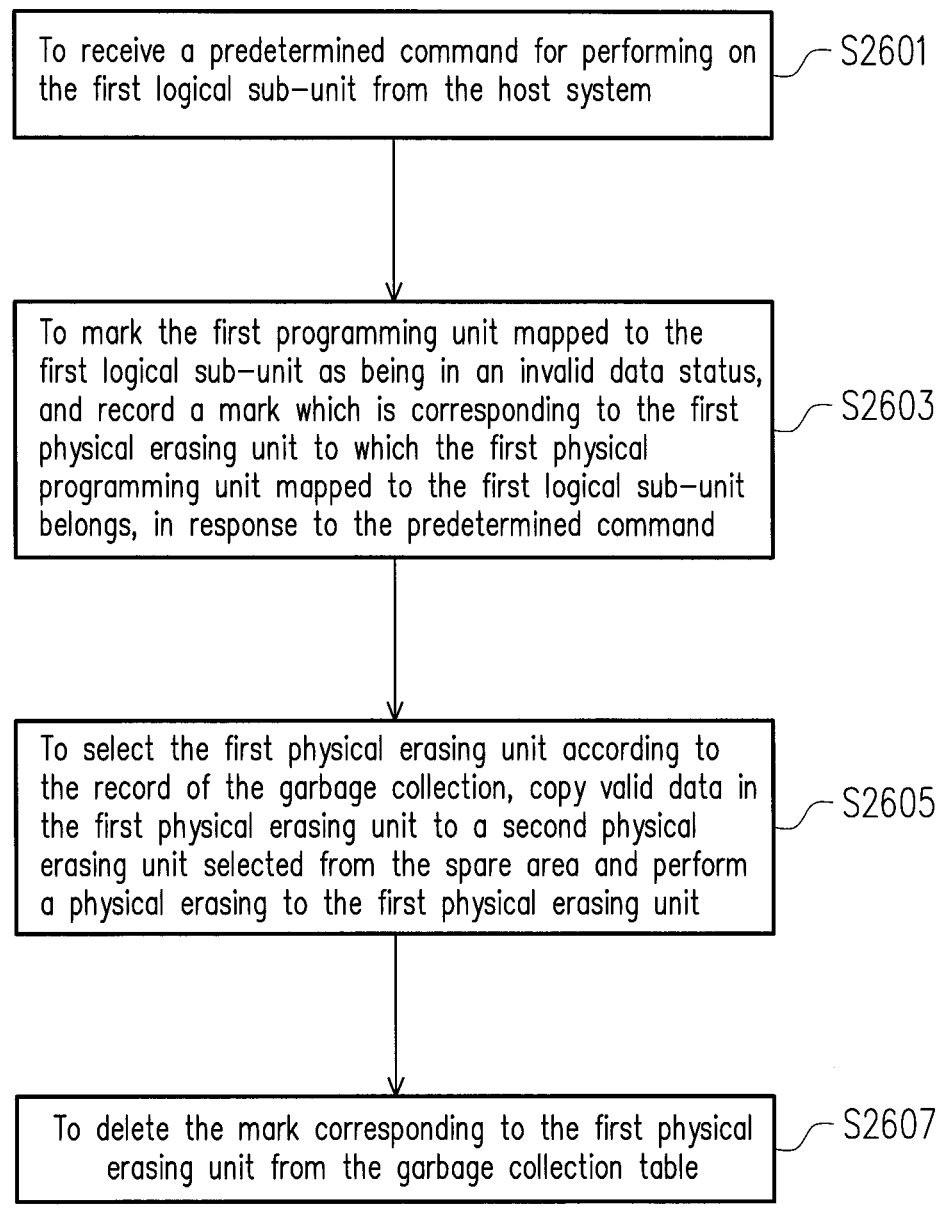

FIG. 25 and FIG. 26 are flowcharts illustrating a data erasing method according to an exemplary embodiment of the present invention.

Referring to FIG. 25, in the step S2501, the memory control circuit unit 104 (or memory management circuit 202) may also may group the physical erasing unit of the rewritable non-volatile memory module 106 into at least a data area 502 and a spare area 504, and configure a plurality of logical units having a plurality of logical sub-units for accessing by the host system 1000.

In step S2503, the memory control circuit unit 104 (or memory management circuit 202) receives a write command and data (hereinafter, refer to first data) corresponding to the write command from the host system 1000, wherein the write command indicates writing the first data into one of these logical sub-units (hereinafter, refer to the first logical sub-unit).

In the step S2505, the memory control circuit unit 104 (or memory management circuit 202) selects a physical erasing unit (hereinafter, refer to the first physical erasing unit) from the physical erasing units in the spare area 504, programs the first data into the physical programming unit (hereinafter, refer to the first programming unit) of the first physical erasing unit according to the write command, and maps the first logical sub-unit to the first physical programming unit.

Referring to FIG. 26, in the step S2601, the memory control circuit unit 104 (or memory management circuit 202) receives a predetermined command for performing on the first logical sub-unit from the host system 1000.

In the step S2603, the memory control circuit unit 104 (or memory management circuit 202) marks the first programming unit mapped to the first logical sub-unit as being in an invalid data status, and records a mark which is corresponding to the first physical erasing unit to which the first physical programming unit mapped to the first logical sub-unit belongs, in response to the predetermined command.

And then, in the step S2605, the memory control circuit unit 104 (or memory management circuit 202) selects the first physical erasing unit according to the record of the garbage collection, copies valid data in the first physical erasing unit to a second physical erasing unit selected from the spare area 504 and performs a physical erasing to the first physical erasing unit.

Finally, in the step S2607, the memory control circuit unit 104 (or memory management circuit 202) deletes the mark corresponding to the first physical erasing unit from the garbage collection table.

In conclusion, the data erasing method, memory control circuit unit and memory storage apparatus provided by the exemplary embodiment of the present invention will, according to the asking of the host system, actually erase the data which is intended to be deleted from the flash memory module to prevent the data from being recovered or stolen. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data erasing method is provided for a rewritable non-volatile memory module, wherein the rewritable non-volatile memory module comprises a plurality of physical erasing units, and each of the physical erasing units comprises a plurality of physical programming units, the data erasing method comprising:
grouping the plurality of physical erasing units into at least a data area and a spare area;
configuring a plurality of logical units, wherein the plurality of logical units comprise a plurality of logical sub-units;
receiving a write command and first data corresponding to the write command from a host system, wherein the write command indicates writing the first data into a first logical sub-unit of the plurality of logical sub-units;
selecting a first physical erasing unit from the plurality of physical erasing units of the spare area, programming the first data into a first physical programming unit of the first physical erasing unit according to the write command, and mapping the first logical sub-unit to the first physical programming unit;
receiving a predetermined command for performing on the first logical sub-unit from the host system;
marking the first physical programming unit mapped to the first logical sub-unit as being in the invalid status according to the predetermined command and recording the first physical erasing unit that the first physical programming unit belongs to in a garbage collection table in response to the predetermined command; and
after recording the first physical erasing unit in the garbage collection table, identifying the first physical erasing unit corresponding to the first physical programming unit mapped to the first logical sub-unit from physical erasing units recorded in the garbage collection table, copying valid data of the first physical erasing unit to a second physical erasing unit selected from the plurality of physical erasing units of the spare area, and performing a physical erasing operation to the first physical erasing unit.

2. The data erasing method of claim 1, further comprising:
after performing the physical erasing operation to the first physical erasing unit, deleting the first physical erasing unit from the garbage collection table.

3. The data erasing method of claim 1, wherein the predetermined command for performing on the first logical sub-unit is a trim command indicating that data in the first logical sub-unit is deletable, or a predetermined write command indicating that writing a predetermined state data in the first logical sub-unit.

4. The data erasing method of claim 1, wherein the steps of identifying the first physical erasing unit corresponding to the first physical programming unit mapped to the first logical sub-unit from physical erasing units recorded in the garbage collection table, copying the valid data of the first physical erasing unit to the second physical erasing selected from the physical erasing units of the spare area, and performing the physical erasing operation to the first physical erasing unit are performed in a background performing mode of a memory control circuit unit.

5. A memory control circuit unit, for controlling a rewritable non-volatile memory module, the memory control circuit unit comprising:
a host interface, configured to couple to a host system;
a memory interface, configured to couple to the rewritable non-volatile memory module, wherein the rewritable non-volatile memory module comprises a plurality of physical erasing units, and each of the physical erasing units comprises a plurality of physical programming units; and
a memory management circuit, coupled to the host interface and the memory interface, wherein the memory management circuit is configured to group the physical erasing units into at least a data area and a spare area,
wherein the memory management circuit is further configured to configure a plurality of logical units and the plurality of logical units comprise a plurality of logical sub-units,
wherein the memory management circuit is further configured to receive a write command and first data corresponding to the write command from a host system, wherein the write command indicates writing the first data into a first logical sub-unit of the plurality of logical sub-units,
wherein the memory management circuit is further configured to select a first physical erasing unit from the physical erasing units of the spare area, program the first data into a first physical programming unit of the first physical erasing unit according to the write command, and map the first logical sub-unit to the first physical programming unit,
wherein the memory management circuit is further configured to receive a predetermined command for performing on the first logical sub-unit from the host system,
wherein the memory management circuit is further configured to mark the first physical programming unit mapped to the first logical sub-unit as being in the invalid status according to the predetermined command and to record the first physical erasing unit that the first physical programming unit belongs to in a garbage collection table in response to the predetermined command,
wherein after recording the first physical erasing unit in the garbage collection table, the memory management circuit is further configured to identify the first physical erasing unit corresponding to the first physical programming unit mapped to the first logical sub-unit from physical erasing units recorded in the garbage collection table, copy valid data of the first physical erasing unit to a second physical erasing unit selected from the plurality of physical erasing units of the spare area, and perform a physical erasing to the first physical erasing unit.

6. The memory control circuit unit of claim 5, wherein the memory management circuit is further configured, after performing the physical erasing operation to the first physical erasing unit, to delete the first physical erasing unit from the garbage collection table.

7. The memory control circuit unit of claim 5, wherein the predetermined command for performing on the first logical sub-unit is a trim command indicating that data in the first logical sub-unit was deleted, or a predetermined write command indicating that writing a predetermined state data in the first logical sub-unit.

8. The memory control circuit unit of claim 5, wherein the memory control circuit unit, in a background performing mode, performs the operations of confirming the first physical erasing unit to which the first physical programming unit mapped to the first logical sub-unit belongs from physical erasing units recorded in the garbage collection table, copying the valid data of the first physical erasing unit to the second physical erasing unit selected from the physical erasing units of the spare area, and performing the physical erasing operation to the first physical erasing unit.

9. A memory storage apparatus, comprising:
- a connect interface unit, configured to couple to a host system;
- a rewritable non-volatile memory module having a plurality of physical erasing units, wherein each of the physical erasing units has a plurality of physical programming units; and
- a memory control circuit unit, coupled to the connect interface unit and the rewritable non-volatile memory module, wherein the memory control circuit unit is configured to group the physical erasing units into at least a data area and a spare area,
- wherein the memory control circuit unit is further configured to configure a plurality of logical units and the plurality of logical units comprise a plurality of logical sub-units,
- wherein the memory control circuit unit is further configured to receive a write command and first data corresponding to the write command from the host system, wherein the write command indicates writing the first data into a first logical sub-unit of the plurality of logical sub-units,
- wherein the memory control circuit unit is further configured to select a first physical erasing unit from the plurality of physical erasing units of the spare area, program the first data into a first physical programming unit of the first physical erasing unit according to the write command, and map the first logical sub-unit to the first physical programming unit,
- wherein the memory control circuit unit is further configured to receive a predetermined command for performing on the first logical sub-unit from the host system,
- wherein the memory control circuit unit is further configured to mark the first physical programming unit mapped to the first logical sub-unit as being in the invalid status according to the predetermined command and to record the first physical erasing unit that the first physical programming unit belongs to in a garbage collection table in response to the predetermined command,
- wherein after recording the first physical erasing unit in the garbage collection table, the memory control circuit unit is further configured to identify the first physical erasing unit corresponding to the first physical programming unit mapped to the first logical sub-unit from physical erasing units recorded in the garbage collection table, copy valid data of the first physical erasing unit to a second physical erasing unit selected from the plurality of physical erasing units of the spare area, and perform a physical erasing to the first physical erasing unit.

10. The memory storage apparatus of claim 9, wherein the memory control circuit unit is further configured, after performing the physical erasing operation to the first physical erasing unit, to delete the first physical erasing unit from the garbage collection table.

11. The memory storage apparatus of claim 9, wherein the predetermined command for performing on the first logical sub-unit is a trim command indicating that data in the first logical sub-unit was deleted, or a predetermined write command indicating that writing a predetermined state data in the first logical sub-unit.

12. The memory storage apparatus of claim 9, wherein the memory control circuit unit performs, in a background performing mode, the operations of confirming the first physical erasing unit to which the first physical programming unit mapped to the first logical sub-unit belongs from physical erasing units recorded in the garbage collection table, copying the valid data of the first physical erasing unit to the second physical erasing unit selected from the physical erasing units of the spare area, and performing the physical erasing operation to the first physical erasing unit.

* * * * *